US012698680B2

(12) United States Patent
Wernberg et al.

(10) Patent No.: US 12,698,680 B2
(45) Date of Patent: Aug. 4, 2026

(54) MULTI-POSITION LADDER BUCKET

(71) Applicant: Tricam Industries, Inc., Eden Prairie, MN (US)

(72) Inventors: Benjamin M. Wernberg, Savage, MN (US); Joseph P. Foley, Mendota Heights, MN (US); Ryan P. Ellsworth, Chanhassen, MN (US); Benjamin P. Williams, Chaska, MN (US)

(73) Assignee: Tricam Industries, LLC, Eden Prairie, MN (US)

( * ) Notice: Subject to any disclaimer, the term of this patent is extended or adjusted under 35 U.S.C. 154(b) by 464 days.

(21) Appl. No.: 18/499,290

(22) Filed: Nov. 1, 2023

(65) Prior Publication Data

US 2024/0151107 A1 May 9, 2024

Related U.S. Application Data

(60) Provisional application No. 63/382,169, filed on Nov. 3, 2022.

(51) Int. Cl.
*E06C 7/14* (2006.01)
*E06C 1/32* (2006.01)

(52) U.S. Cl.
CPC . *E06C 7/14* (2013.01); *E06C 1/32* (2013.01)

(58) Field of Classification Search
CPC ..... E06C 7/14; E06C 1/32; E06C 7/02; E06C 7/423; E06C 7/16; B25H 3/02; B25H 3/06
See application file for complete search history.

(56) References Cited

U.S. PATENT DOCUMENTS

| | | | | | |
|---|---|---|---|---|---|
| 2,412,567 | A * | 12/1946 | Dodd | E06C 7/14 | 248/210 |
| 2,470,053 | A * | 5/1949 | Salisbury | E06C 1/32 | 182/120 |
| 4,437,544 | A * | 3/1984 | Anderson | E06C 7/165 | 182/120 |
| 4,653,713 | A * | 3/1987 | Hamilton | B25H 3/02 | D32/53.1 |
| 5,388,665 | A * | 2/1995 | Newman | E06C 7/16 | 182/118 |
| 5,673,885 | A * | 10/1997 | Pham | E06C 7/14 | 248/210 |
| 5,941,344 | A * | 8/1999 | Spadaro | E06C 7/14 | 248/210 |
| 5,950,972 | A * | 9/1999 | Irish | E06C 7/14 | 248/210 |
| 6,382,354 | B2 * | 5/2002 | Ahl | E06C 7/14 | 248/210 |
| 7,861,826 | B2 * | 1/2011 | Meyers | E06C 7/16 | 182/120 |

(Continued)

FOREIGN PATENT DOCUMENTS

| | | | | |
|---|---|---|---|---|
| EP | 0426401 B1 * | 12/1993 | | E06C 7/14 |
| GB | 2371593 A * | 7/2002 | | E06C 7/14 |

*Primary Examiner* — Brian D Mattei
*Assistant Examiner* — Kathleen M. McFarland

(57) ABSTRACT

A bucket for a multi-position ladder is disclosed. The bucket provides an area for workspace or for storage of tools or materials. The bucket is configured to be removably attachable at the top of the ladder when in use in the A-frame position or removably attached to the ladder and preferably within the boundaries of the ladder when not in use.

20 Claims, 29 Drawing Sheets

(56) References Cited

U.S. PATENT DOCUMENTS

| | | | | |
|---|---|---|---|---|
| 7,931,123 | B2 * | 4/2011 | Moldthan | E06C 1/393 182/161 |
| 8,016,076 | B2 * | 9/2011 | Parker | E06C 7/14 182/20 |
| D678,550 | S * | 3/2013 | Carlson | D25/68 |
| 8,397,870 | B2 * | 3/2013 | Parker | E06C 7/14 182/20 |
| 8,453,796 | B2 * | 6/2013 | Astor | E06C 7/00 182/119 |
| 8,636,144 | B1 * | 1/2014 | Lawery | E06C 7/14 220/570 |
| 9,784,033 | B2 * | 10/2017 | Moss | E06C 1/30 |
| 10,087,682 | B2 * | 10/2018 | Pfeifer | E06C 7/14 |
| 10,167,668 | B1 * | 1/2019 | Wang | E06C 1/16 |
| 10,184,292 | B2 * | 1/2019 | Latimer | E06C 1/18 |
| 10,501,989 | B1 * | 12/2019 | McDonough | E06C 7/143 |
| 11,655,676 | B2 * | 5/2023 | Foley | E06C 7/14 248/238 |
| 12,084,917 | B2 * | 9/2024 | Wernberg | E06C 1/20 |
| 12,090,625 | B2 * | 9/2024 | Barton | B25H 3/04 |
| 12,305,447 | B2 * | 5/2025 | Hyma | E06C 1/18 |
| 12,331,592 | B2 * | 6/2025 | Foley | E06C 1/18 |
| D1,095,890 | S * | 9/2025 | Wernberg | D25/68 |
| 12,523,096 | B2 * | 1/2026 | Russell | E06C 1/18 |
| 2001/0025908 | A1 * | 10/2001 | Ahl | E06C 7/14 248/210 |
| 2002/0017430 | A1 * | 2/2002 | Rosko | E06C 1/393 248/238 |
| 2002/0100848 | A1 * | 8/2002 | Ahl | E06C 7/146 248/211 |
| 2002/0166724 | A1 * | 11/2002 | Kvam | E06C 7/14 182/129 |
| 2004/0108164 | A1 * | 6/2004 | Pruett | E06C 7/14 182/129 |
| 2007/0221802 | A1 * | 9/2007 | New | E06C 7/143 248/210 |
| 2007/0284191 | A1 * | 12/2007 | Astor | E06C 7/00 182/129 |
| 2009/0200113 | A1 * | 8/2009 | Weiss | E06C 7/084 182/209 |
| 2010/0025153 | A1 * | 2/2010 | Decker | E06C 7/14 182/129 |
| 2012/0211305 | A1 * | 8/2012 | Moss | E06C 1/39 182/180.1 |
| 2012/0217093 | A1 * | 8/2012 | Latimer | E06C 7/14 182/129 |
| 2014/0251729 | A1 * | 9/2014 | Parker | E06C 1/393 182/129 |
| 2014/0346784 | A1 * | 11/2014 | Boutin | B62J 7/04 292/194 |
| 2017/0234069 | A1 * | 8/2017 | Pfeifer | E06C 7/182 248/238 |
| 2018/0355667 | A1 * | 12/2018 | Wang | E06C 1/387 |
| 2021/0246725 | A1 * | 8/2021 | Wernberg | E06C 7/48 |
| 2022/0126437 | A1 * | 4/2022 | Barton | B25H 3/04 |
| 2022/0195800 | A1 * | 6/2022 | Foley | E06C 1/18 |
| 2022/0243532 | A1 * | 8/2022 | Russell | E06C 1/18 |
| 2024/0110443 | A1 * | 4/2024 | Lawrence | E06C 7/423 |
| 2024/0151107 | A1 * | 5/2024 | Wernberg | E06C 7/14 |

* cited by examiner

A - A

B - B

D - D

MULTI-POSITION LADDER BUCKET

RELATED APPLICATION

The present application claims the benefit of U.S. Provisional Application No. 63/382,169, filed Nov. 3, 2022, which is hereby incorporated herein in its entirety by reference.

FIELD OF THE INVENTION

The present invention relates to a detachable bucket for use with a ladder that provides additional space at the top of the stepladder but may be conveniently stored within the boundaries of the ladder when not in use.

BACKGROUND OF THE INVENTION

It is often inconvenient, however, to use a removable tool or paint tray with a ladder. In some instances, the tray may be difficult to attach or remove from the ladder depending on the configuration of the top cap of the ladder. The removable tray and ladder usually must be stored separately, taking up additional space. Additionally, to move a ladder from place to place, the tray may need to be removed and carried separately because of weight or awkward transport configuration.

Ladders, step stools, and stepladders are generally known in the art. Kummerlin, U.S. Pat. No. 4,502,564, discloses a foldable step ladder. Because of their desired portability, foldable stepladders often include handles and other features that make them easier to transport. Lucci, U.S. Pat. No. 3,744,591, discloses a portable, folding stepladder.

When working on a ladder, step stool, or stepladder, it is often desirable to have tools, paint, and other necessary objects within easy reach. For example, it is known to removably attach a paint roller tray to the rung of a ladder to more easily paint a ceiling or other area requiring a ladder. Golden, U.S. Pat. No. 3,625,388, discloses a paint tray particularly useful with an upright ladder.

Utility trays for use with ladder, step stool, or stepladder are also known in the art. Pham, U.S. Pat. No. 5,673,885, discloses a paint tray for a stepladder for storing work materials, tools and a paint bucket that is held onto the stepladder by retaining means. Melanson, U.S. Pat. No. 5,613,574, discloses a stepladder mounted tool holster and parts tray that removably clamps onto the top step of a stepladder. Katz et al., U.S. Pat. No. 6,443,260, discloses a stepladder tray pivotally attached to the top cap of a stepladder for supporting tools and the like. Christ et al., U.S. Pat. No. 5,052,581, discloses a detachable ladder support tray for supporting tools and paint containers. Improvements to add to the amount of space available at the top of a stepladder include U.S. Pat. No. 10,138,680 to Williams, et al., for a hinged tray for a ladder or step stool.

Ladder trays and buckets are known, including those disclosed in U.S. Pat. No. 3,625,388 to Golden; U.S. Pat. No. 5,052,581 to Christ et al.; U.S. Pat. No. 5,613,574 to Melanson; U.S. Pat. No. 5,673,885 to Pham; U.S. Pat. No. 6,443,260 to Katz et al.; U.S. patent application Ser. No. 14/207,887 to Najey (Published as U.S. Pub. No. US20140326538A1); U.S. Pat. No. 9,714,542 to Harcz; U.S. Pat. No. 7,886,872 to Astor et al.; U.S. Pat. No. 8,453,796 to Astor et al.; U.S. Pat. No. 7,128,187 to Simpson; U.S. Pat. No. 7,188,706 to Simpson; U.S. Pat. No. 10,138,680 to Williams et al.; U.S. Pat. No. D833,643 to Foley et al; as well as U.S. patent application Ser. No. 16/654,699 to Foley et al. patented as U.S. Pat. No. 11,505,994); U.S. patent application Ser. No. 16/715,097 to Foley (published as US20200190905 A1); U.S. patent application Ser. No. 16/788,655 to Wernberg, et al. (published as U.S. Pub. No. US20210246725 A1), and U.S. patent application Ser. No. 17/130,414 to Foley et al. (published as U.S. Pub. No. US20220195800 A1), all of which are incorporated herein by reference.

There is a need in the industry to have a bucket that can be removably attached to a ladder to hold tools and hardware but can be removed and stored more easily within the boundaries of the ladder and not interfere with the other functionality of the ladder whether in-use or stored.

SUMMARY OF THE INVENTION

The ladder top cap bucket of the present invention provides an increased work area at the top of a multi-position ladder when in the A-frame position without increasing the overall size of the ladder when in the stored position. In embodiments, a detachable bucket for a ladder is disclosed. The bucket allows for a larger work area on the top of a ladder while the bucket can be removed and stored within the boundaries of the closed ladder. The bucket provides a more easily accessible and easier to store/remove work and storage area than prior art ladder trays without increasing storage space requirements.

The bucket includes easy-to-access buttons to remove the bucket from storage or the top of the ladder while also being in a position that a user on the ladder would not inadvertently activate the button to release the bucket. The bucket is configured to be secured tightly to adjacent rungs on one side of the ladder when in the storage and between top rungs when in the use position. In addition to the clamps associated with buttons holding the bucket to adjacent rungs when in the stored position, the rungs on the other side of the ladder also hold the bucket in the stored position by butting up against the top face of the bucket. The use of linear slide buttons on the bucket allows for secure attachment of the bucket to the rails of the multi-position ladder when the bucket is in the use position even though the tolerances from the play in the hinge creates an inconsistent distance between the rungs on either side of the ladder.

It is an object of the invention to provide a removable bucket for use on a multi-position ladder when in the A-frame position. It is another object of the invention to provide a bucket that does not increase the footprint of the multi-position ladder to eliminate any impact on storing of the multi-position ladder having the utility of bucket. It is a further object of the invention to provide access to the bucket at the top of the ladder, step stool, or stepladder without having to reach over and beyond the top of the ladder. Another object of the invention is to more securely hold the bucket in the stored position.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
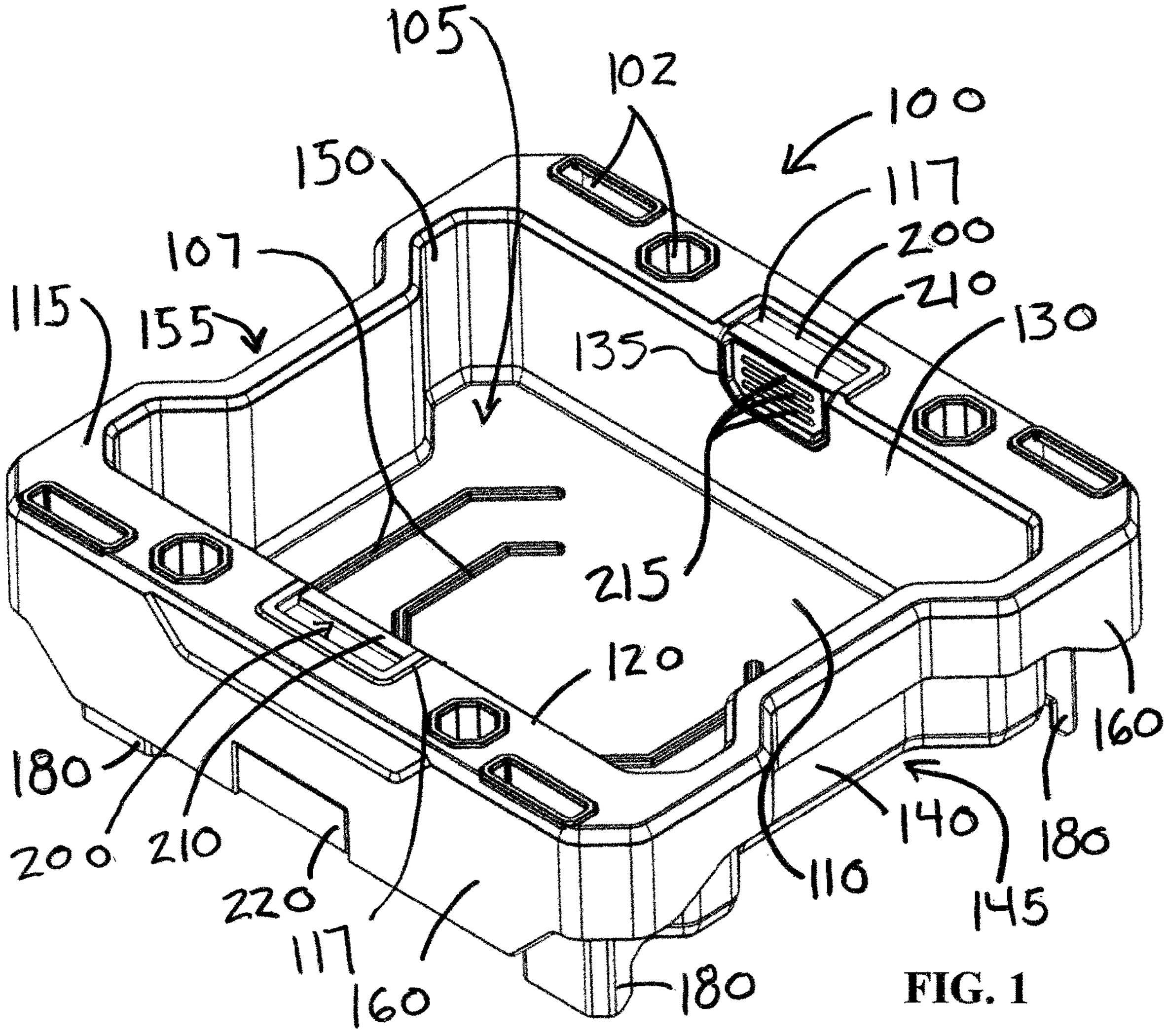
FIG. 1 depicts a perspective view of an embodiment of the multi-position ladder bucket.
Figure 2:
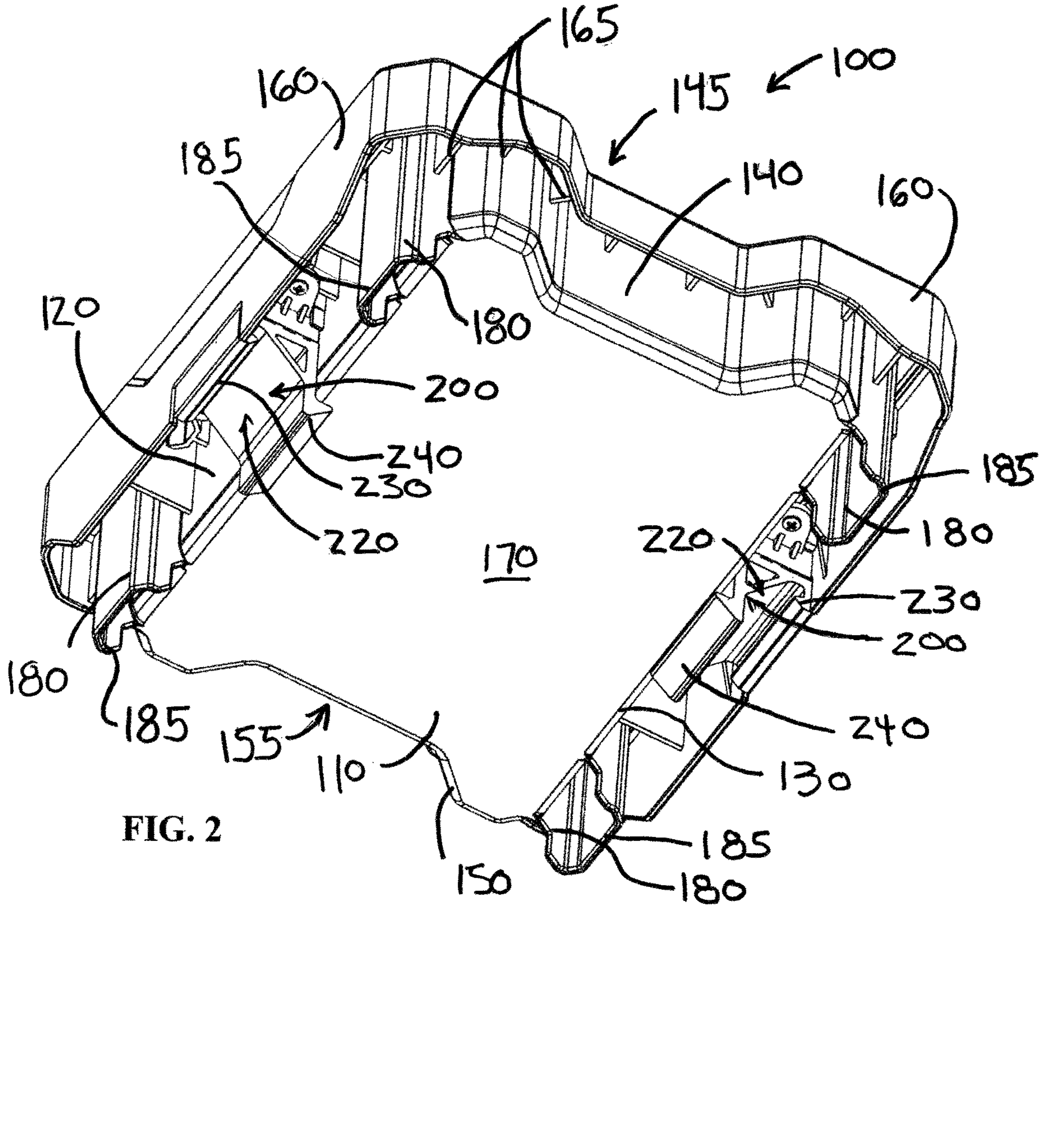
FIG. 2 depicts a second perspective view of the multi-position ladder bucket of FIG. 1.
Figure 3:
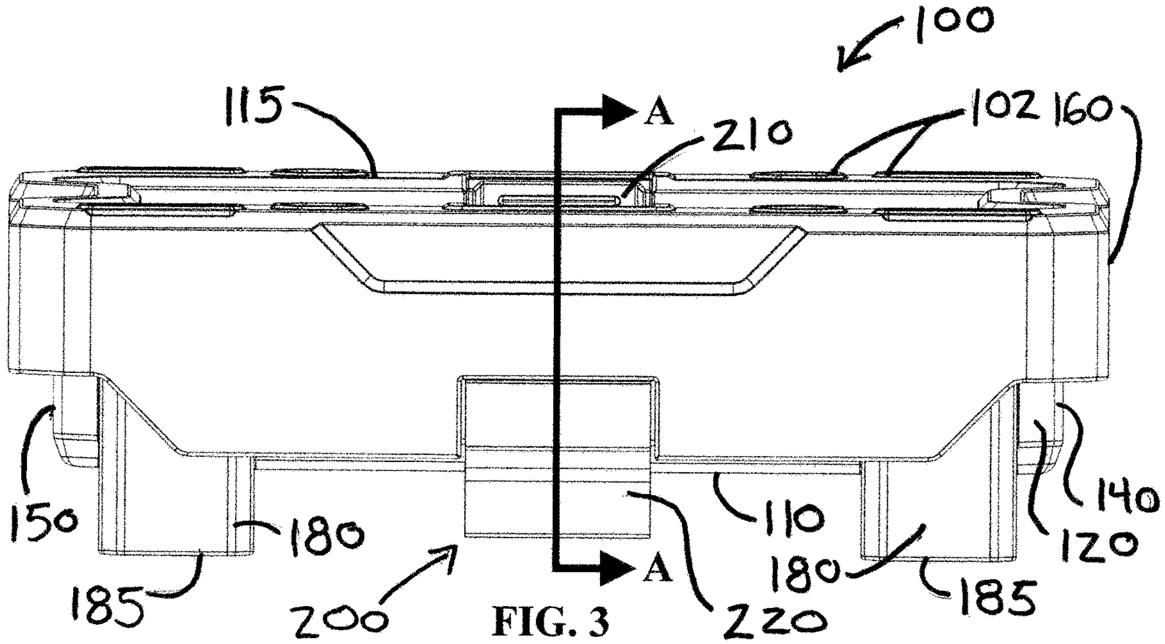
FIG. 3 depicts a front elevation view of the multi-position ladder bucket of FIG. 1.
Figure 4:
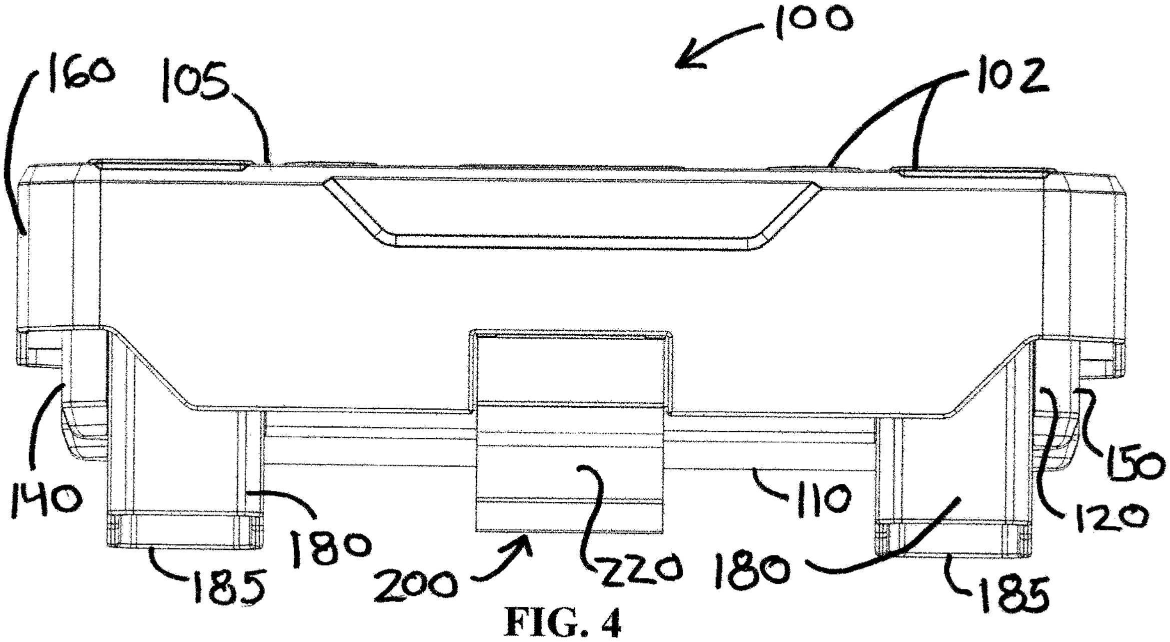
FIG. 4 depicts a rear elevation view of the multi-position ladder bucket of FIG. 1.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The preferred embodiment for the improved ladder bucket is a main body constructed of a single piece of polypropylene injection molded to provide the intricate detailing and varying thickness of the bucket with nylon latch components and steel screws and springs. However, other embodiments may be made of any materials or formed by any methods known in the art. The bucket of the present invention is intended for use with multi-position ladders without a top cap.

A typical prior-art multi-position ladder in the closed or stored orientation incorporating the ladder bucket of the present invention is disclosed FIGS. 10-17. A multi-position ladder 700 will conventionally include four inner rails 730 connected in pairs by a hinge 760 that is adjustable via a hinge lock 770 that allows each pair of outer rails 730 to rotate and vary the angle between the inner rails 730. Adjustably slidable to each inner rail 730 is an outer rail 720 for which an extension lock 780 allows the outer rails 720 to slide along the inner rails 730 to adjust the overall height of the ladder 700. Between the pairs of outer rails 720 are outer rail rungs 740 preferably attached to the outer faces of the outer rails 720 and between the pairs of inner rails 730 are inner rail rungs 750 that preferably are within the profile of the inner rails 730. This arrangement allows each side of the ladder 700 to be independently adjustable in length for varied uses (such as on stairs). Other features that are commonly found on multi-position ladders include a foot 790 at the end of each outer rail 720 and inner rail to provide better traction and protect surfaces on which the ladder 700 is used.

A multi-position ladder bucket 100 in accordance with the present invention is illustrated in detail by FIGS. 1-9. The bucket 100 has a front wall 120, a rear wall 130, a right side wall 140, a left side wall 150 and a bottom 110 forming a bucket interior volume 105. The top of the front wall 120, rear wall 130, right side wall 140, and left side wall 150 define a bucket top surface 115 while the outer face of the bottom 110 defines a bucket bottom outer surface 170. The bucket 100 preferably includes four legs 180 at the corners of the bucket 100, each having a leg bottom surface 185. The legs provide lower clearance for the bucket latch 220 when resting on a planar surface. The bucket top surface 115 and leg bottom surface 185 define a bucket depth 190.

Along the upper edge of the top of the front wall 120, rear wall 130, right side wall 140, and left side wall 150 is formed a bucket lip 160 that provides an area to house the bucket latch mechanism 200 both strength and rigidity to the upper portion of the bucket 100 as well as a gripping area around the exterior of the bucket 100. Bucket lip ribs 165 span the interior of the bucket lip 160 for strength and stability of the lip 160. The bucket 100 may include right side wall inset 145 and left side wall inset 155 to allow clearance past the interior part of the hinge button 770 when in bucket 100 is in the use orientation (FIGS. 18-25), if necessary.

An embodiment of the present invention includes can ridges 107 that are sized for accommodating standard sized paint cans and aid in keeping paint cans from moving while using the multi-position ladder 700. The bucket top surface 115 may include tool orifices 102 that allow tools, hardware, or other materials to be stored in the bucket 100 when in use.

The bucket 100 includes two bucket latch mechanisms 220 that hold the bucket 100 on the ladder 700 while being used ("use orientation") and while being stored ("stored orientation"). The preferred embodiment includes one latch mechanism 200 housed in the lip 160 of the front wall 120 and one latch mechanism 200 housed in the lip 160 of the rear wall 120. Preferably the latch mechanisms 200 identical and, along with the bucket 100 being symmetrical, allows for attachment of the bucket 100 to the ladder regardless of orientation.

Each latch mechanism 200 includes a latch button 210 that is pressed to disengage the bucket 100 from either the use or stored orientations. The latch button 210 is exposed through a front wall button orifice 125 in the front wall 120 or a rear wall button orifice 130 in the rear wall to allow the bucket latch 220 to be conveniently activated. Preferably, each latch button 210 is also exposed throw a bucket top surface button orifice 117. The latch button 210 may include button ridges 215 that provide grip for activating and tactile response for the buttons 210. The bucket latch mechanism 200 may be mounted to the bucket 100 by any means known in the art. The preferred embodiment uses steel screws (see, FIG. 9) to mount the latch mechanism 200.

Figure 5:
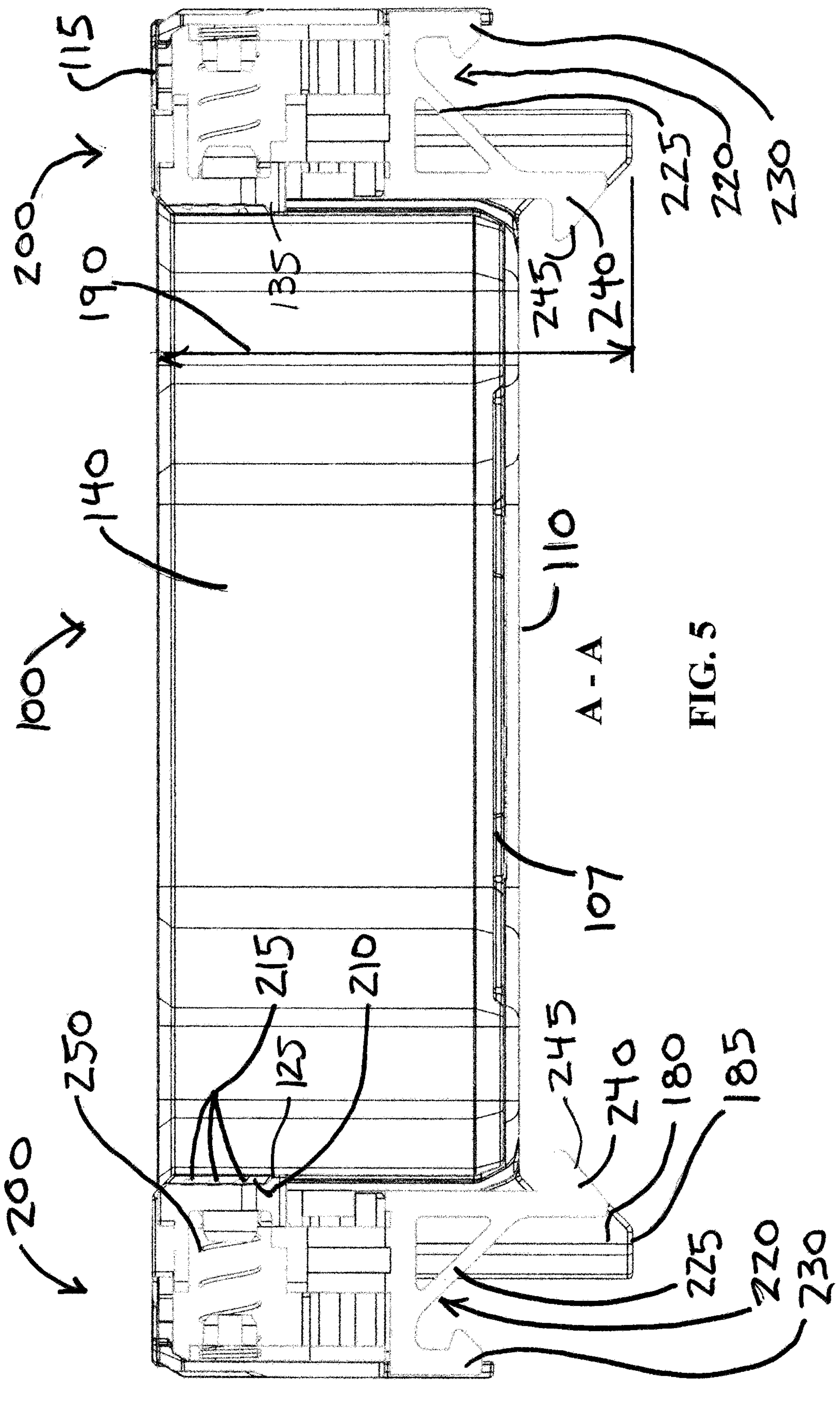
FIG. 5 depicts a cross-sectional view taken along the line A-A in FIG. 3.
Figure 6:
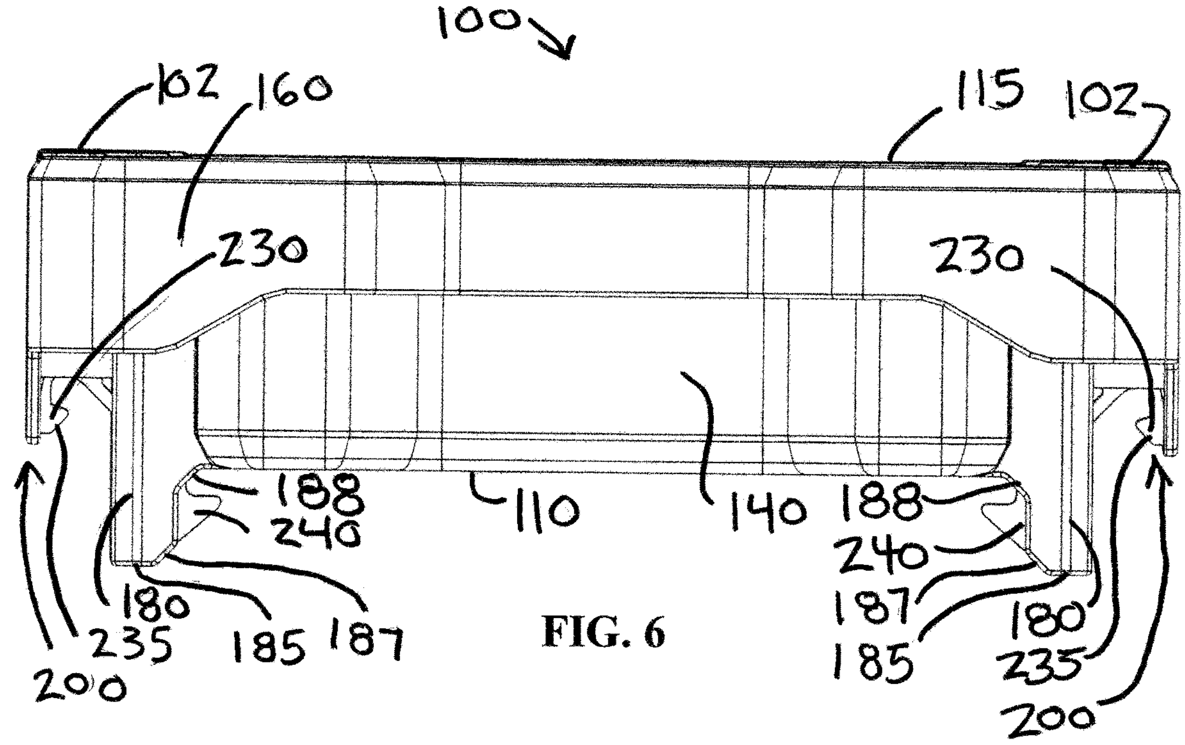
FIG. 6 depicts a left-side view of the multi-position ladder bucket of FIG. 1.
Figure 7:
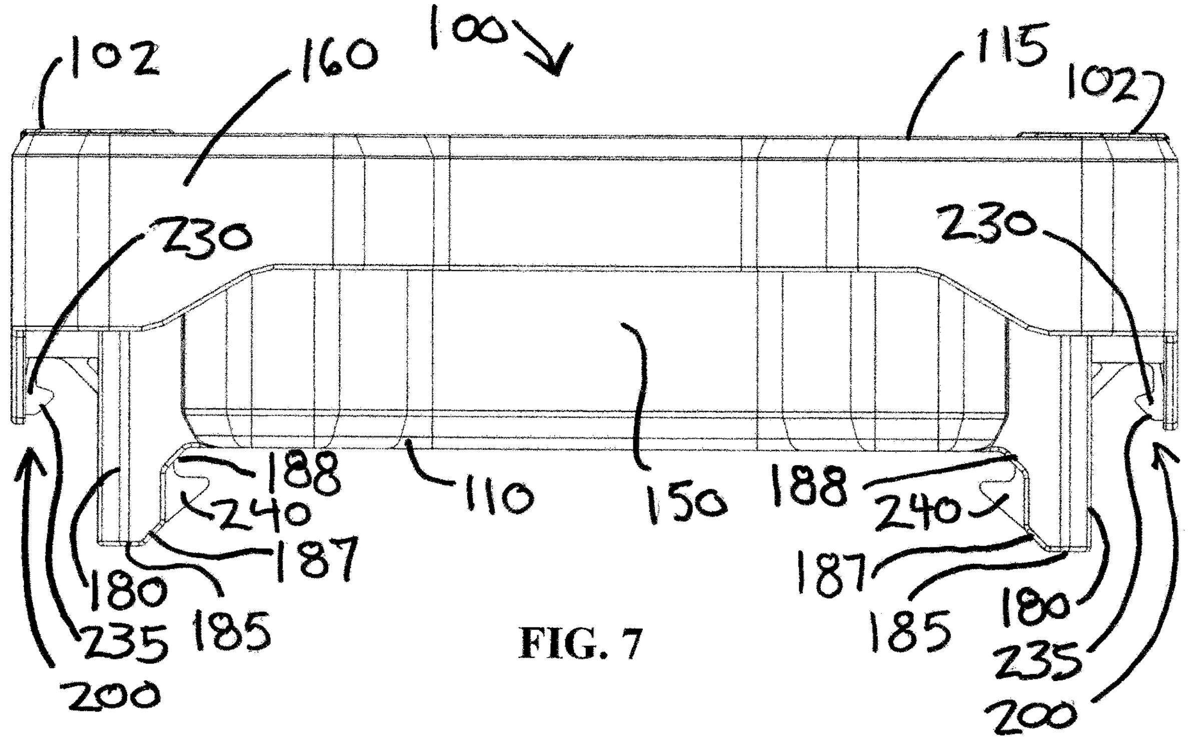
FIG. 7 depicts a right-side view of the multi-position ladder bucket of FIG. 1.
Figure 8:
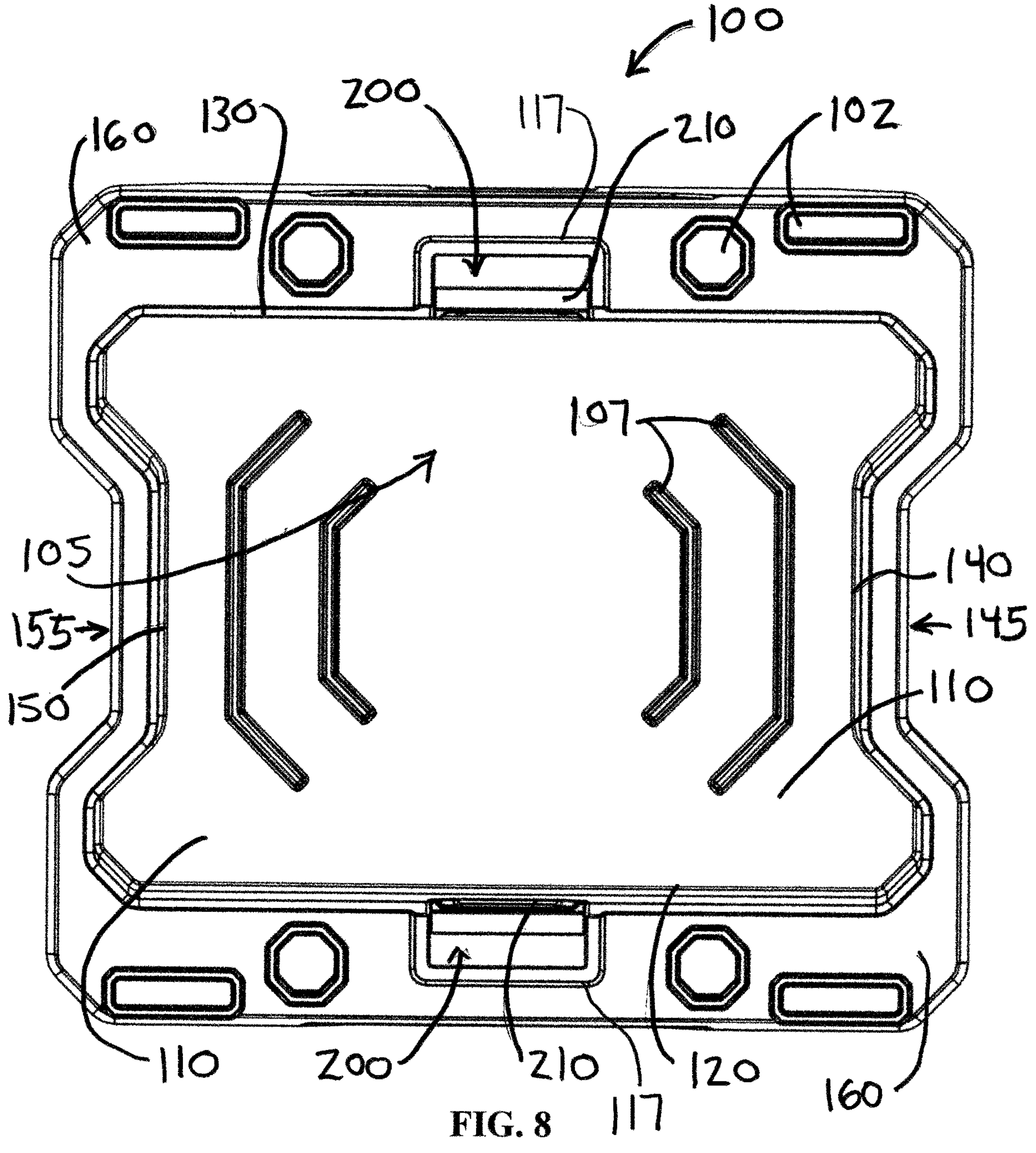
FIG. 8 depicts a top plan view of the multi-position ladder bucket of FIG. 1.
Figure 9:
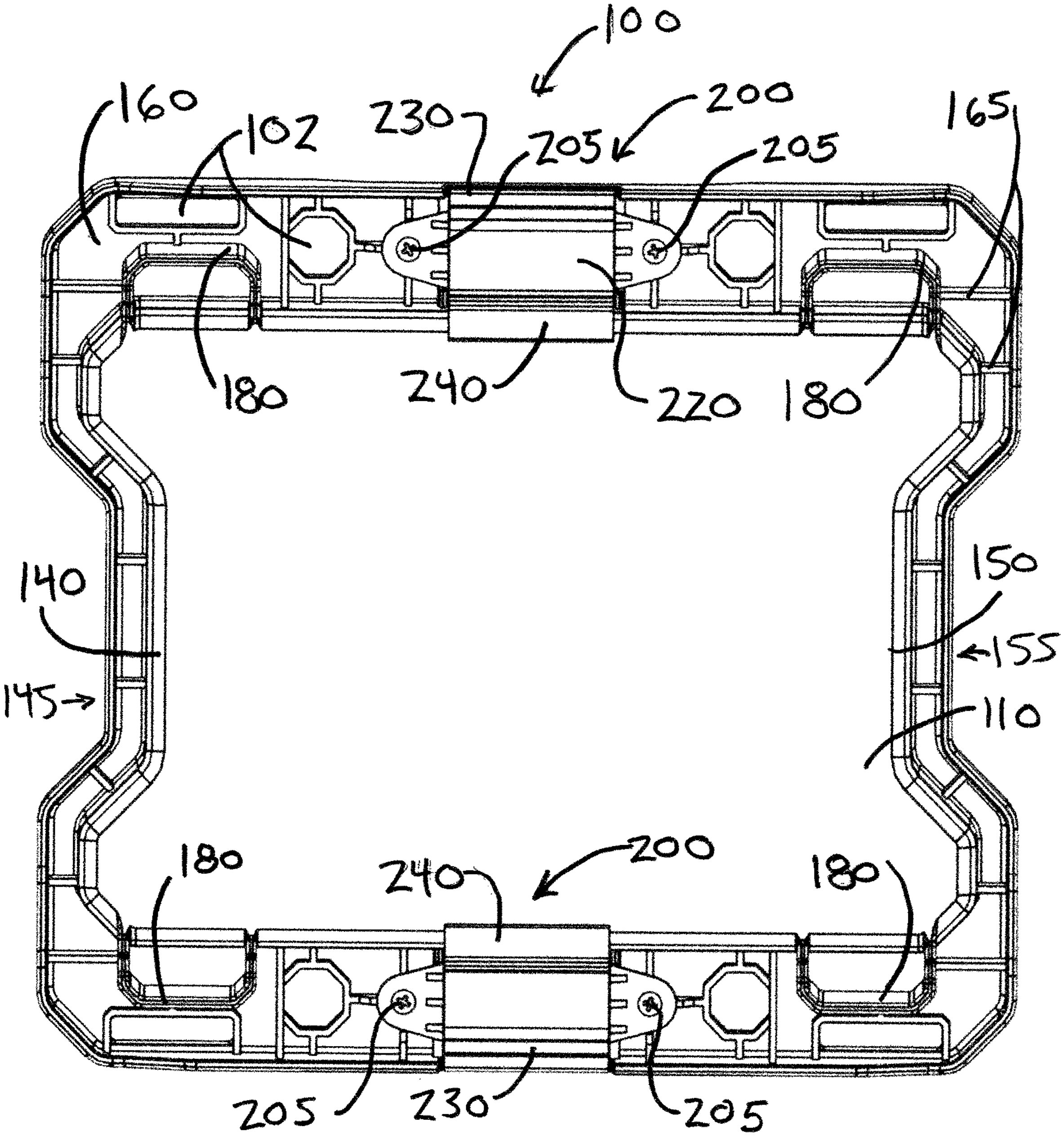
FIG. 9 depicts a bottom plan view of the multi-position ladder bucket of FIG. 1.
Figure 10:
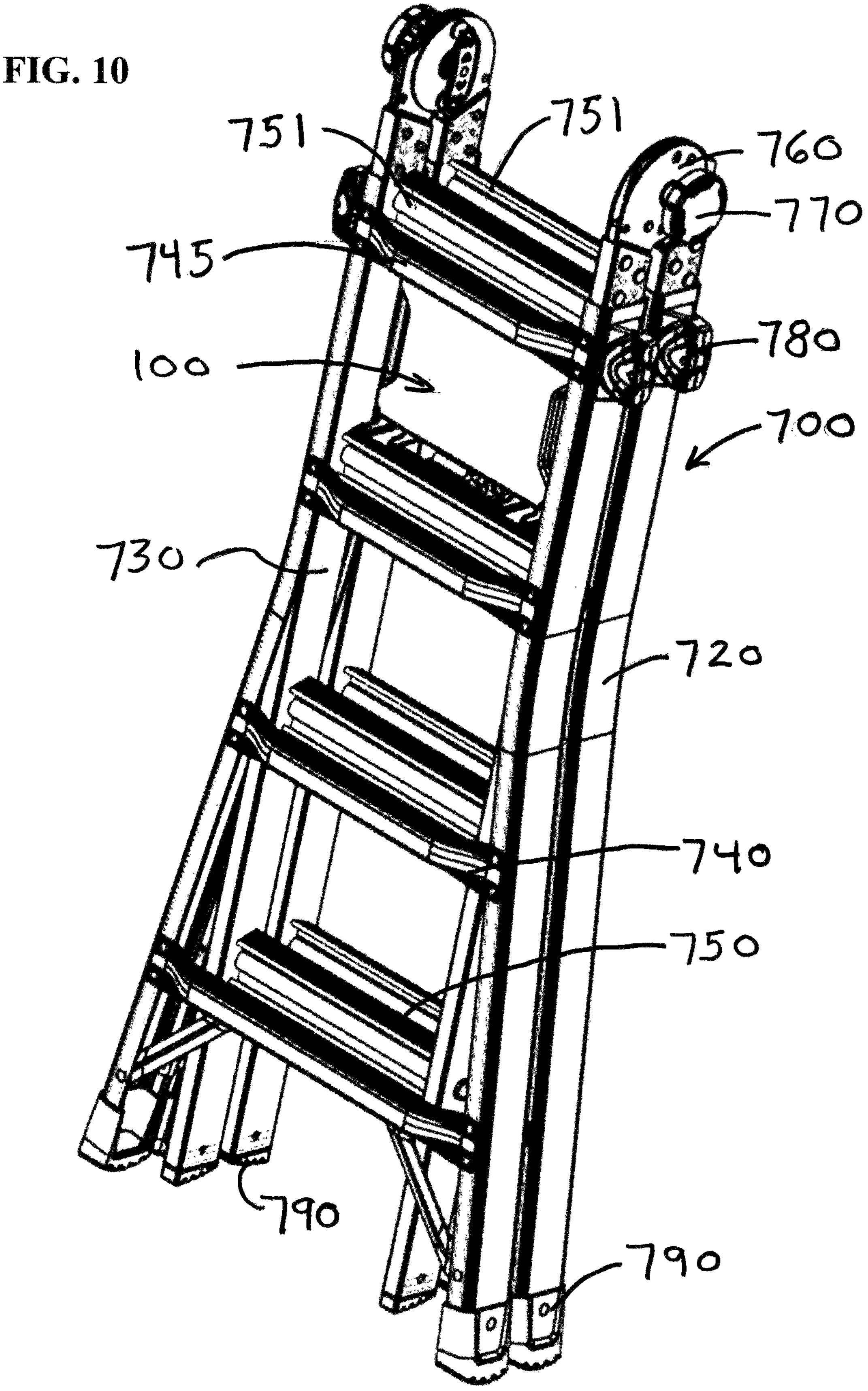
FIG. 10 depicts a perspective view of a multi-position ladder in the closed/stored orientation with an embodiment of the multi-position ladder bucket of FIG. 1.
Figure 11:
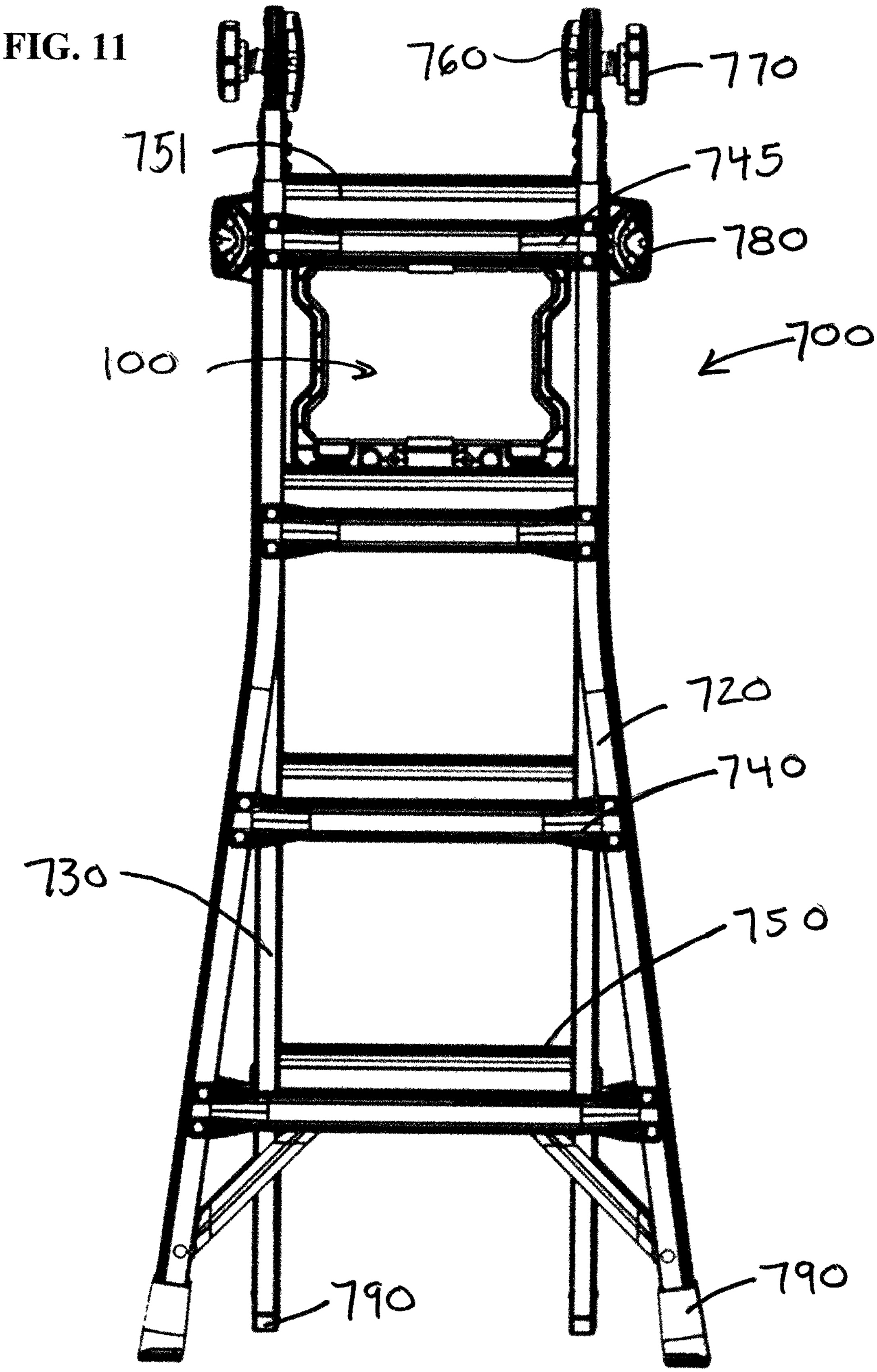
FIG. 11 depicts a front elevation view of the multi-position ladder of FIG. 10.
Figure 12:
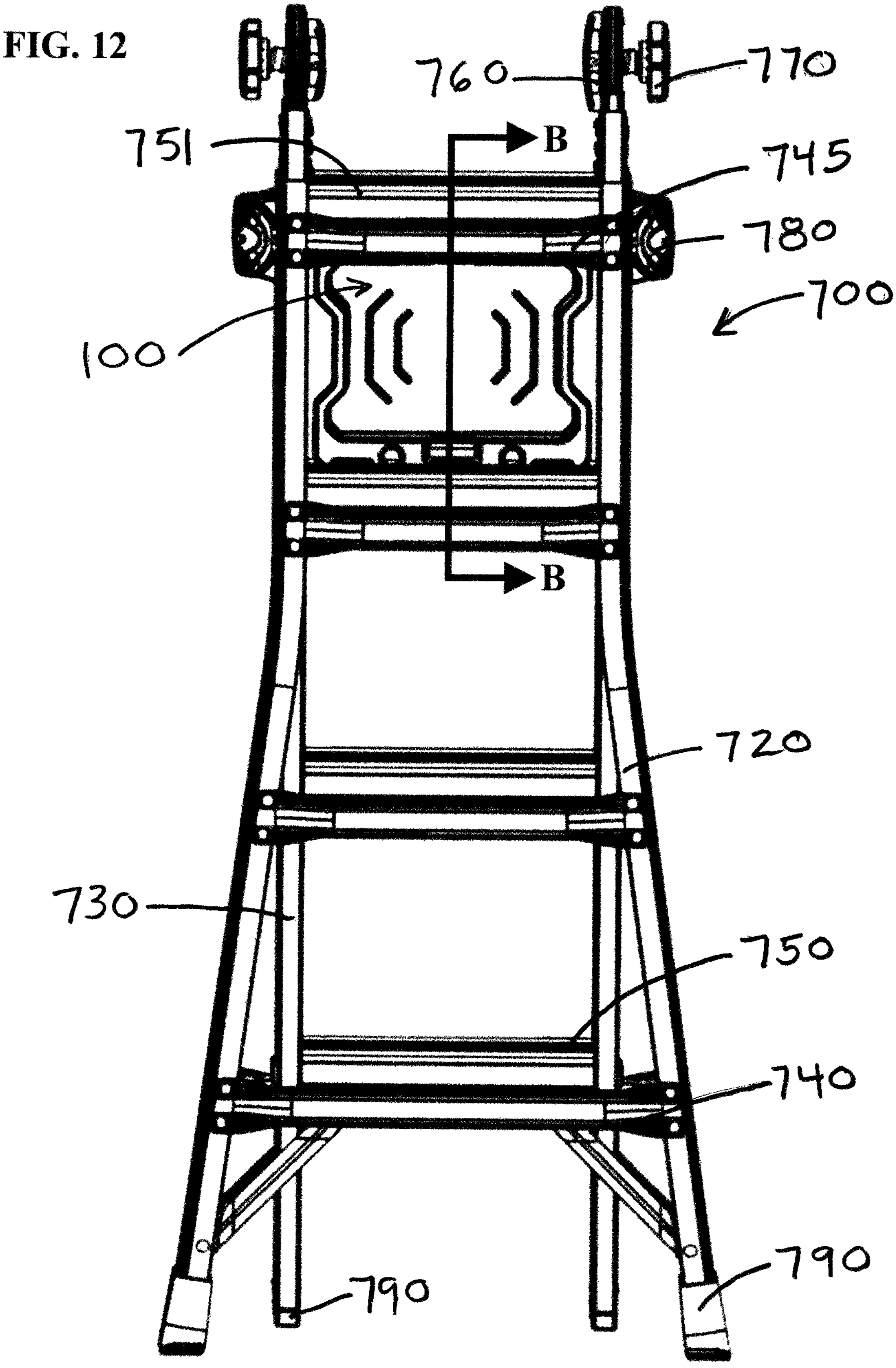
FIG. 12 depicts a rear elevation view of the multi-position ladder of FIG. 10.
Figure 13:
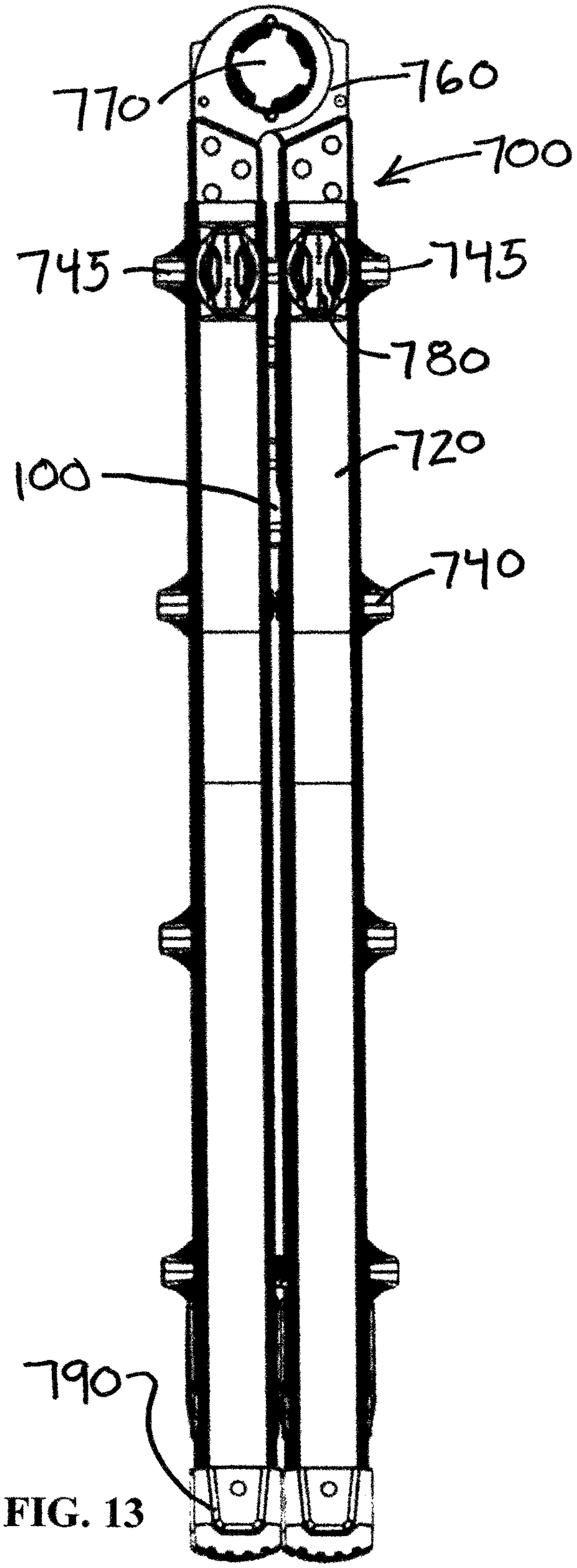
FIG. 13 depicts a left-side view of the multi-position ladder of FIG. 10.
Figure 14:
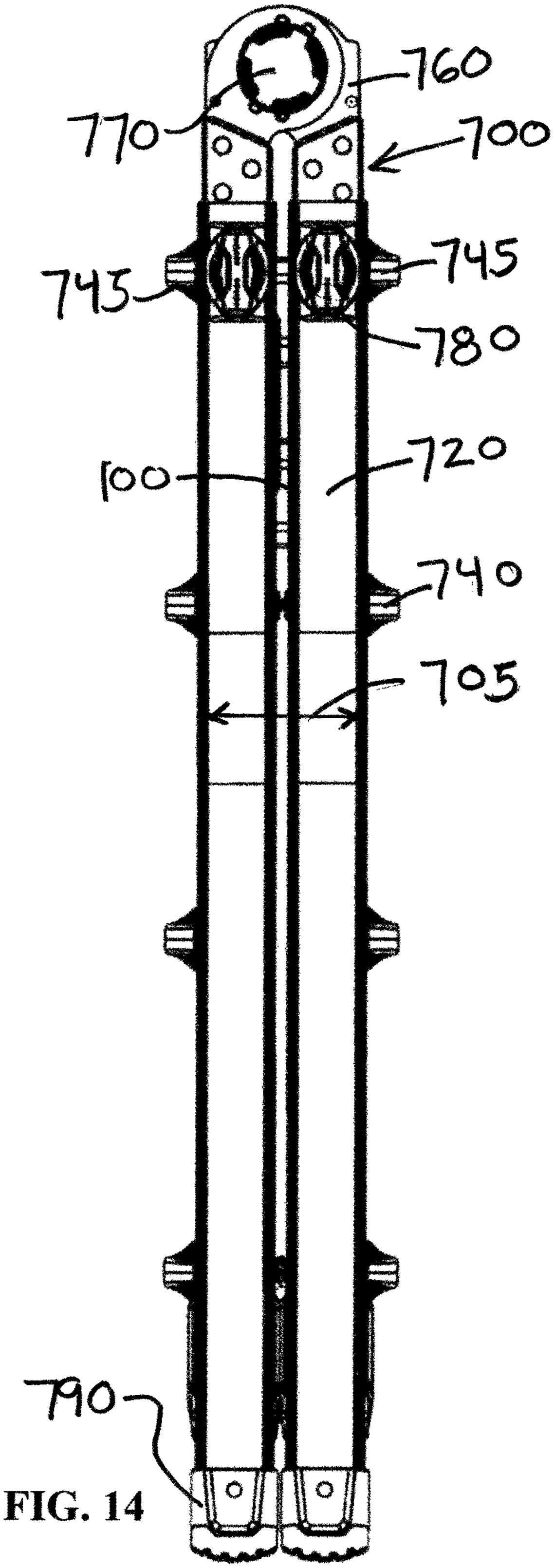
FIG. 14 depicts a right-side view of the multi-position ladder of FIG. 10.

The latch button 210 is operably connected to the bucket latch 220, which includes bucket latch storage clamp 230 and a bucket latch use clamp 240. As best seen in FIG. 5, each latch mechanism 200 includes a spring 250 that biases the latch mechanism 200 to a locked position. Pressing on the latch button 210 from the inside of the bucket 100 causes the latch 220 to slide (move horizontally) out from the locked position. When the latch button 210 is released, the latch spring 250 forces the latch 220 to move horizontally back to the locked position.

FIGS. 10-17 illustrate ladder bucket 100 of the present invention in the stored orientation on a multi-position ladder 700 in its folded orientation. These figures show storage of the bucket 100 between an uppermost ladder inner rail rung 751 and an inner rail adjacent rung 752. However, because multi-position ladders are manufactured with identical rung spacing, the bucket 100 may be stored between any pair of adjacent inner rail rungs 750. With this configuration, each bucket latch storage clamp 230 attaches around a part of two adjacent inner rail rungs 750 to hold the bucket 100 in place (see, FIG. 17). The preferred embodiment has the bucket 100 dimensioned to that the bucket top surface 115 is pressed against the inner rail opposite rung 755 and inner rail opposite adjacent rung 757 to further lock the bucket 100 in the stored orientation.

Placing the bucket 100 into the stored orientation can be accomplished by pressing the latch buttons 210 to slide the bucket latches 220 outward, placing the bucket 100 in position abutting the uppermost ladder inner rail rung 751 and the ladder inner rail adjacent rung 752 and then releasing the latch buttons 210. Alternatively, the bucket latch storage clamp outer face 235 and latch inner surface 225 are angled to allow the bucket 200 to be pressed against the uppermost ladder inner rail rung 751 and the ladder inner rail adjacent rung 752, which will force the bucket latch 220 to move horizontally outward without having to press the latch buttons 210. Note that releasing the bucket 100 cannot be done in the same way and requires pressing of the bucket latch buttons 210.

Figure 15:
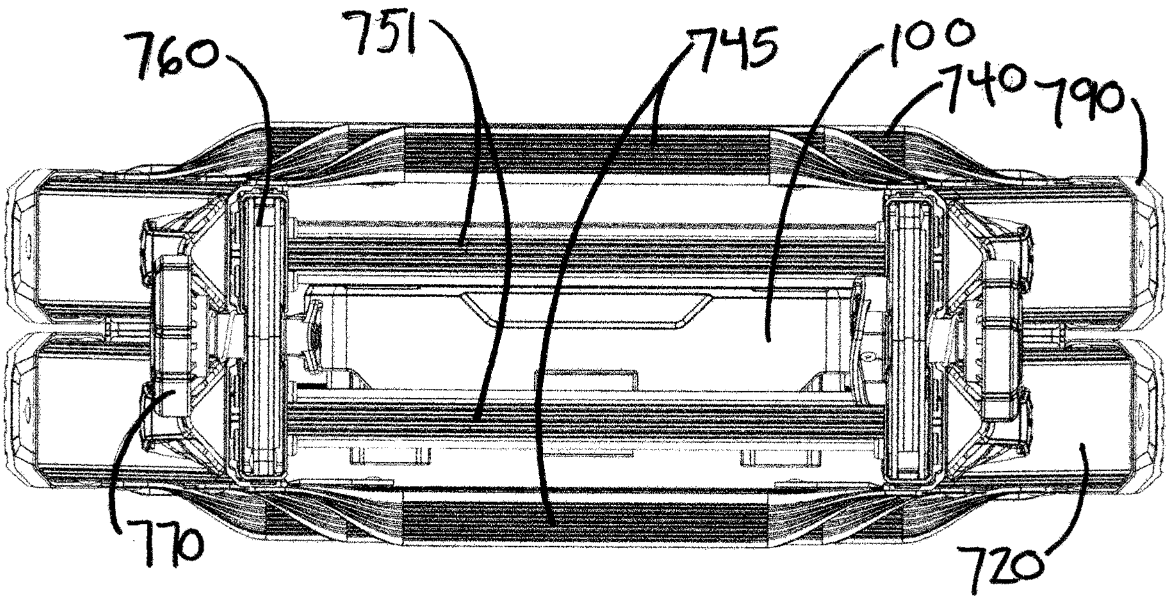
FIG. 15 depicts a top plan view of the multi-position ladder of FIG. 10.
Figure 16:
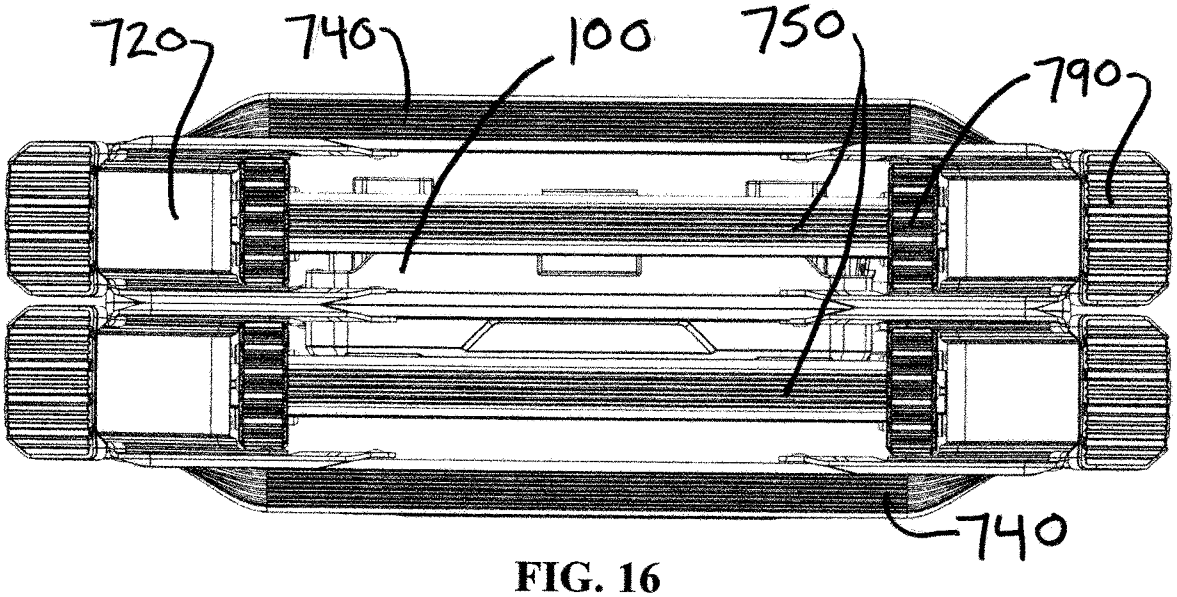
FIG. 16 depicts a bottom plan view of the multi-position ladder of FIG. 10.
Figure 17:
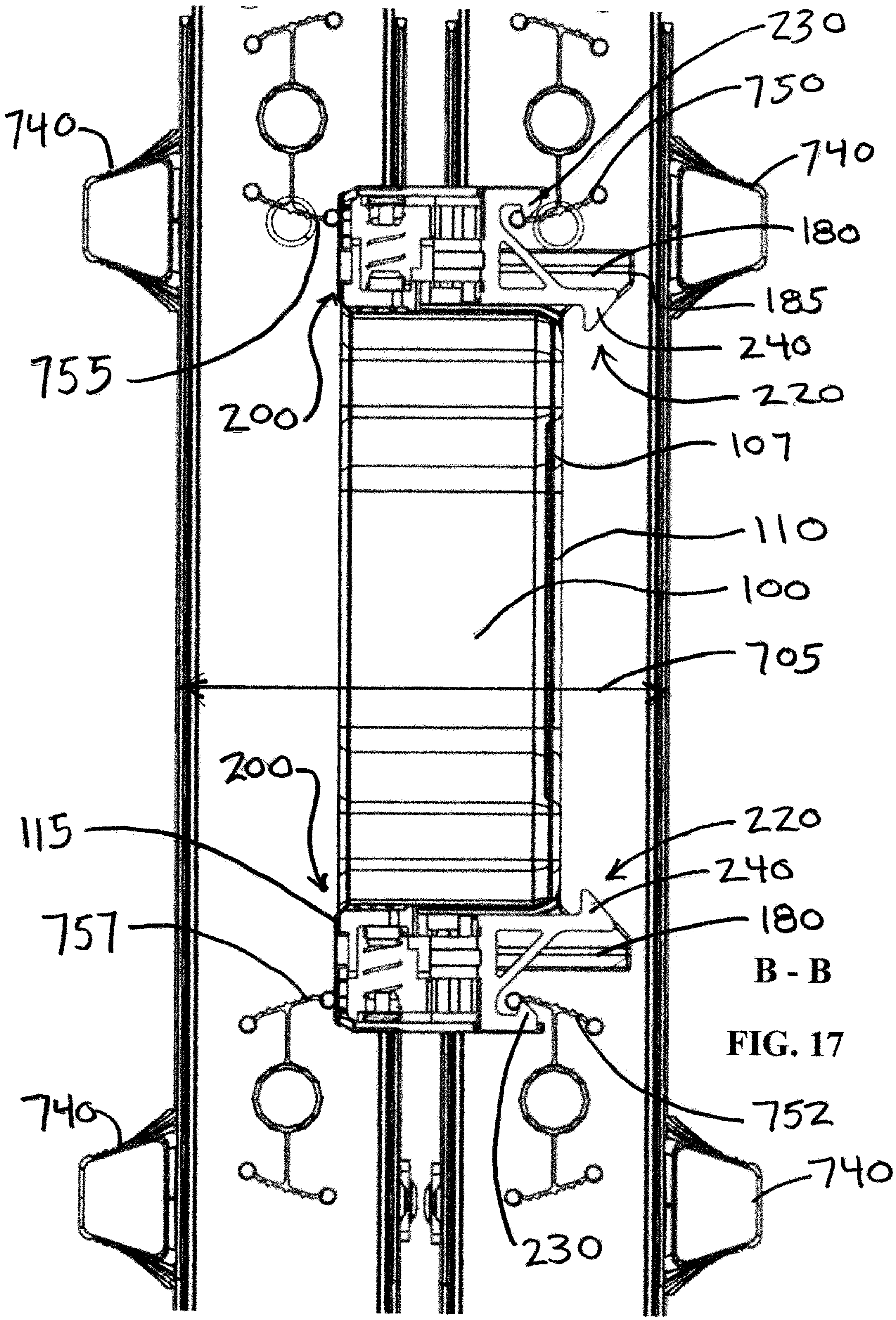
FIG. 17 depicts a cross-sectional view taken along the line B-B in FIG. 12.
Figure 18:
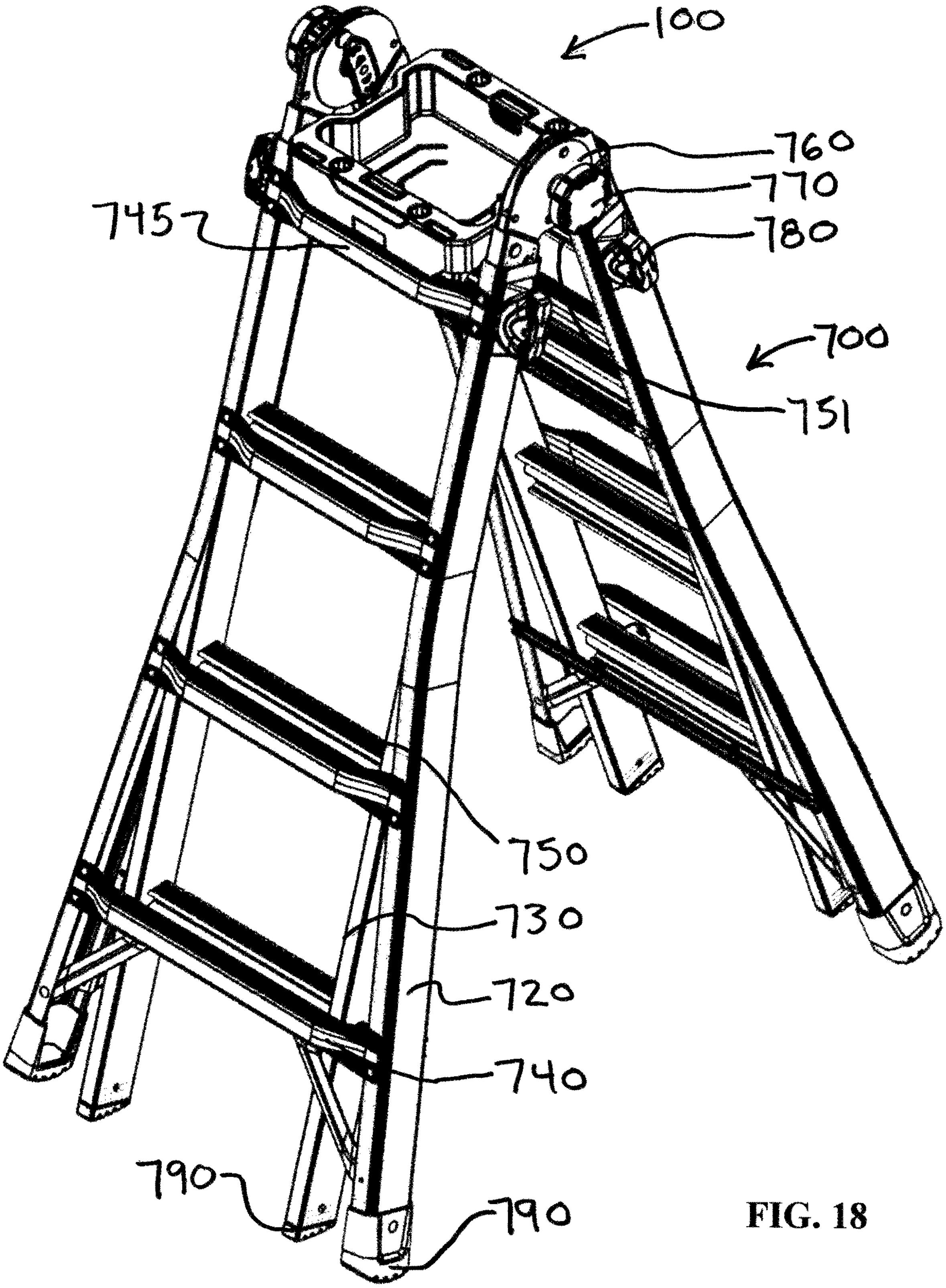
FIG. 18 depicts a perspective view of a multi-position ladder in an open/in-use orientation with an embodiment of the multi-position ladder bucket of FIG. 1 in the use position.
Figure 19:
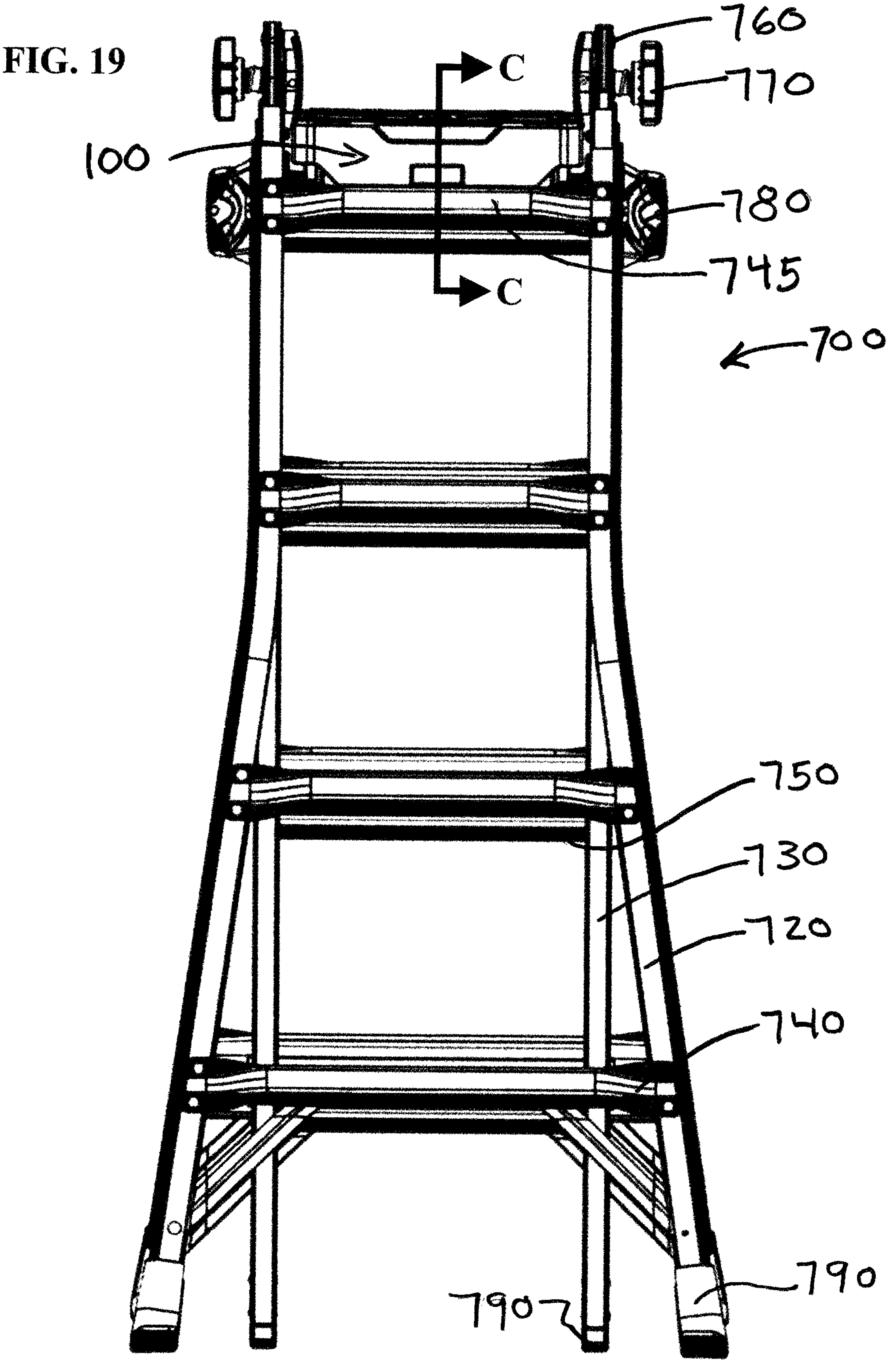
FIG. 19 depicts a front elevation view of the multi-position ladder of FIG. 18.
Figure 20:
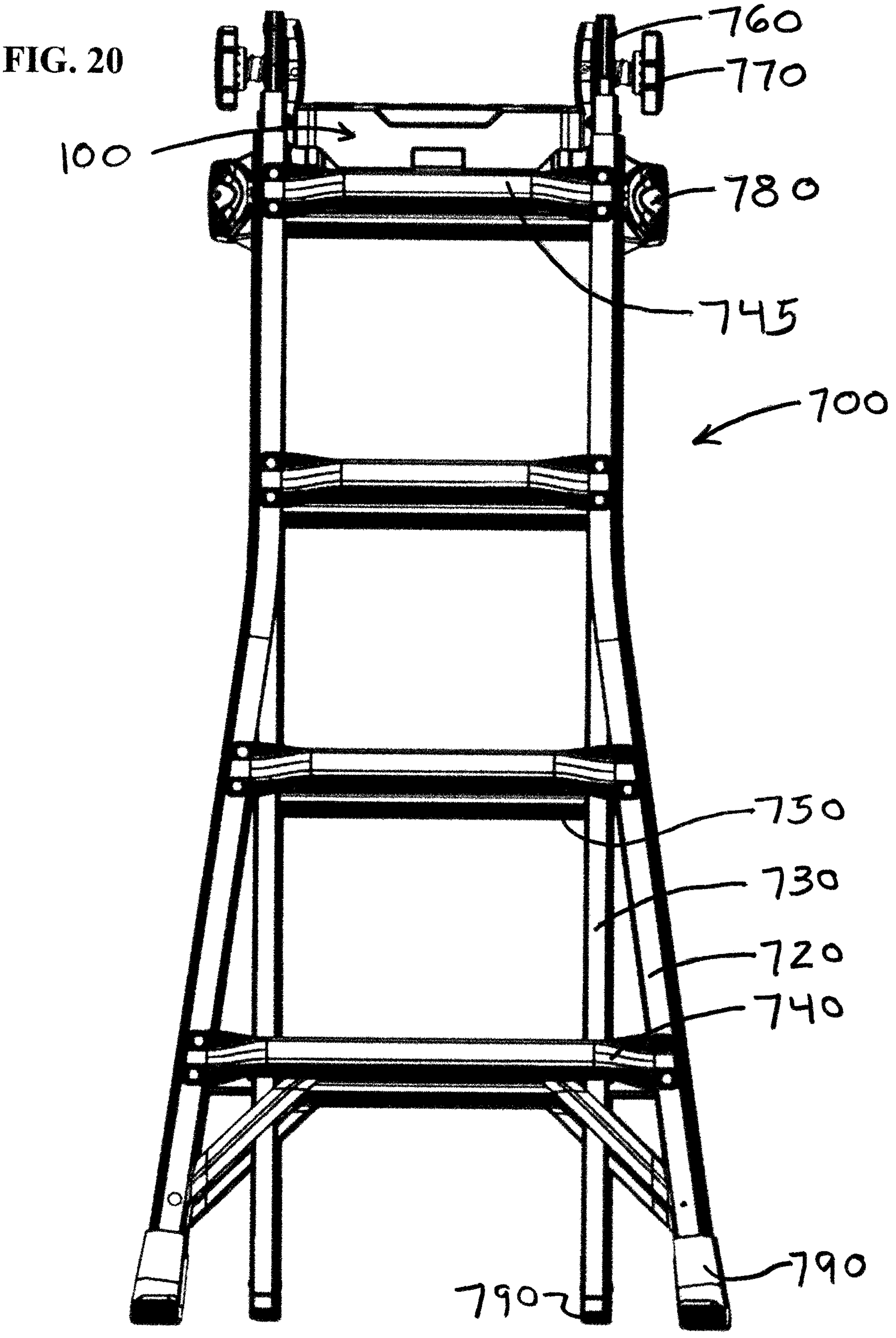
FIG. 20 depicts a rear elevation view of the multi-position ladder of FIG. 18.
Figure 21:
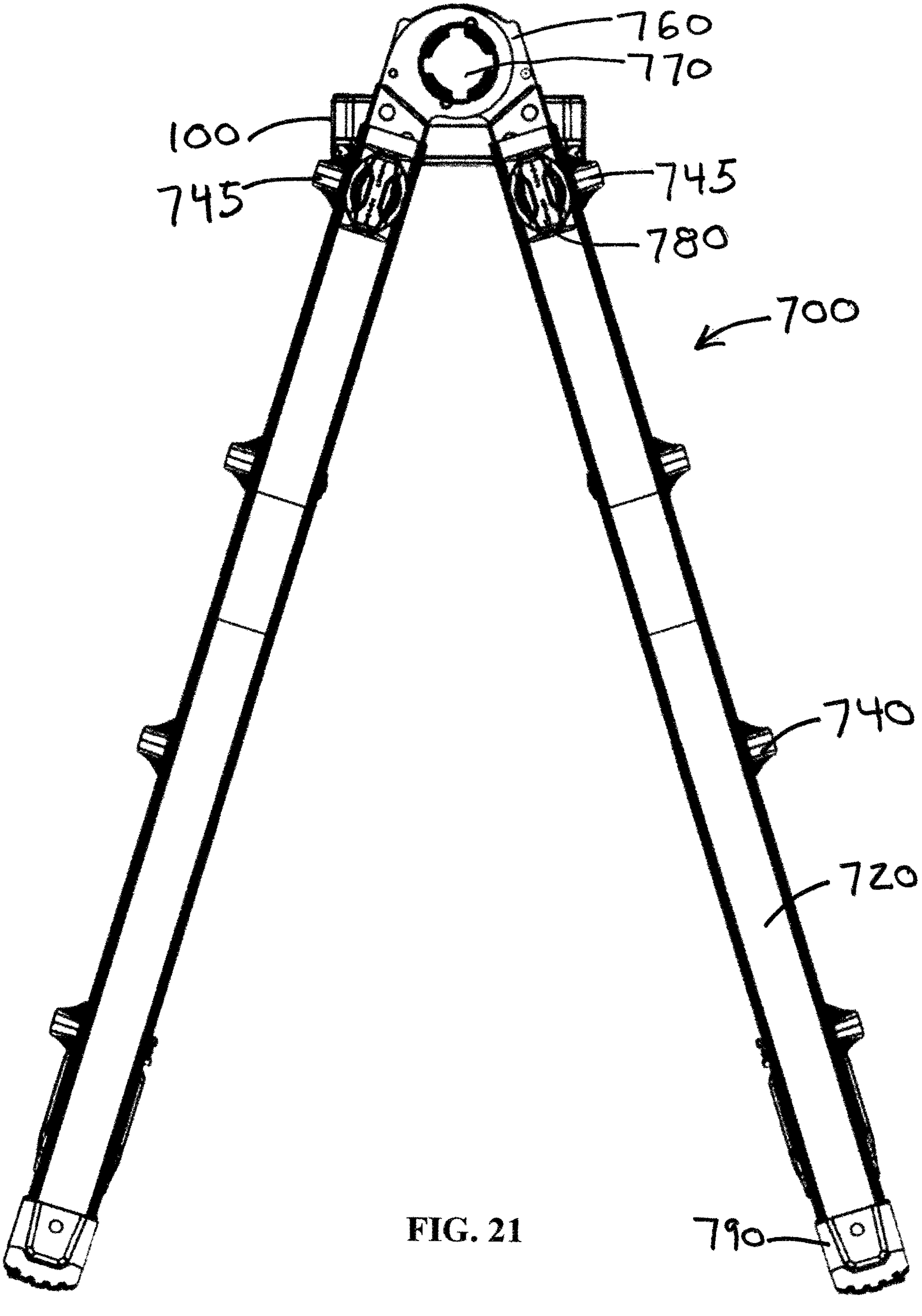
FIG. 21 depicts a left-side view of the multi-position ladder of FIG. 18.
Figure 22:
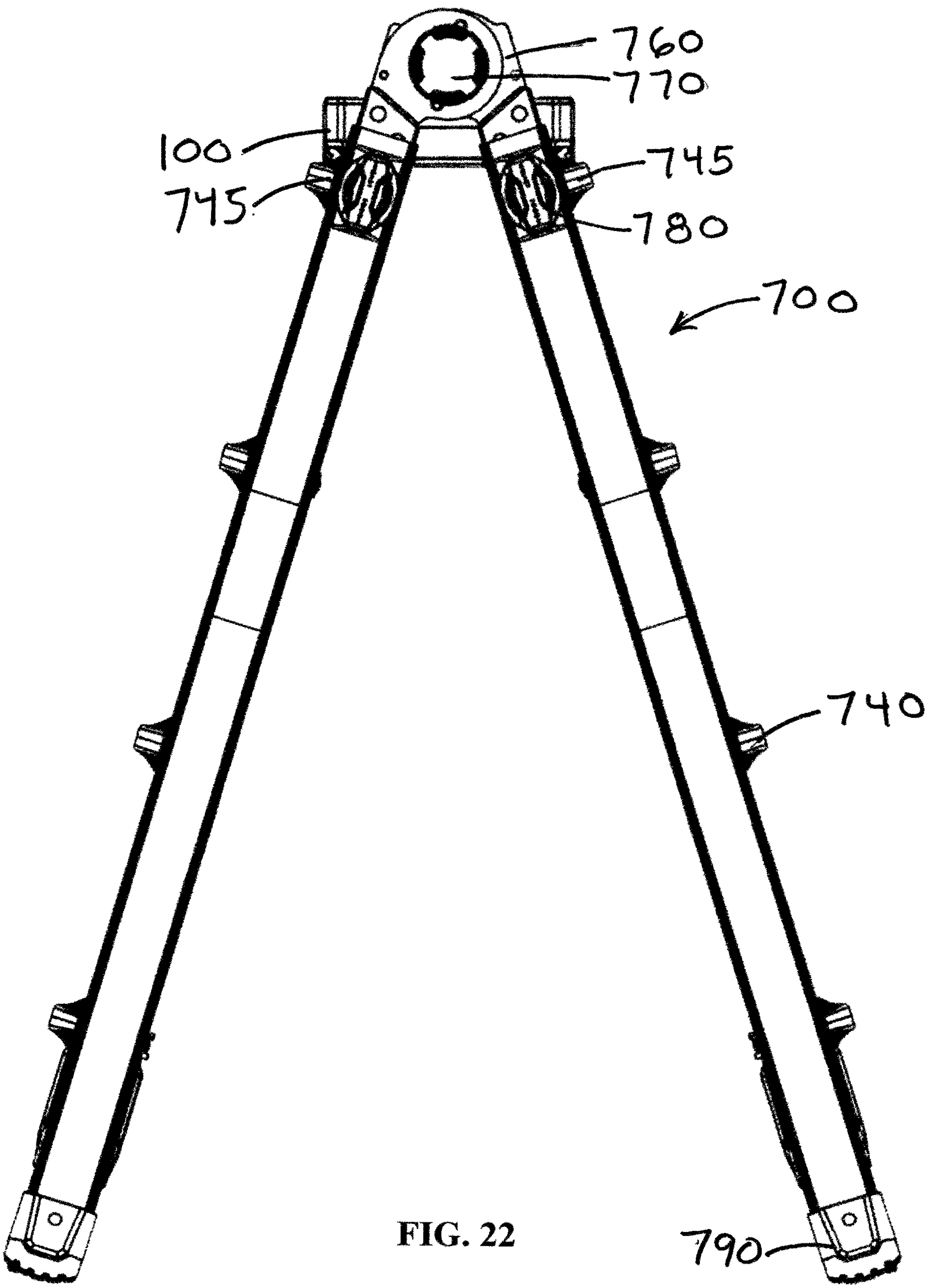
FIG. 22 depicts a right-side view of the multi-position ladder of FIG. 18.
Figure 23:
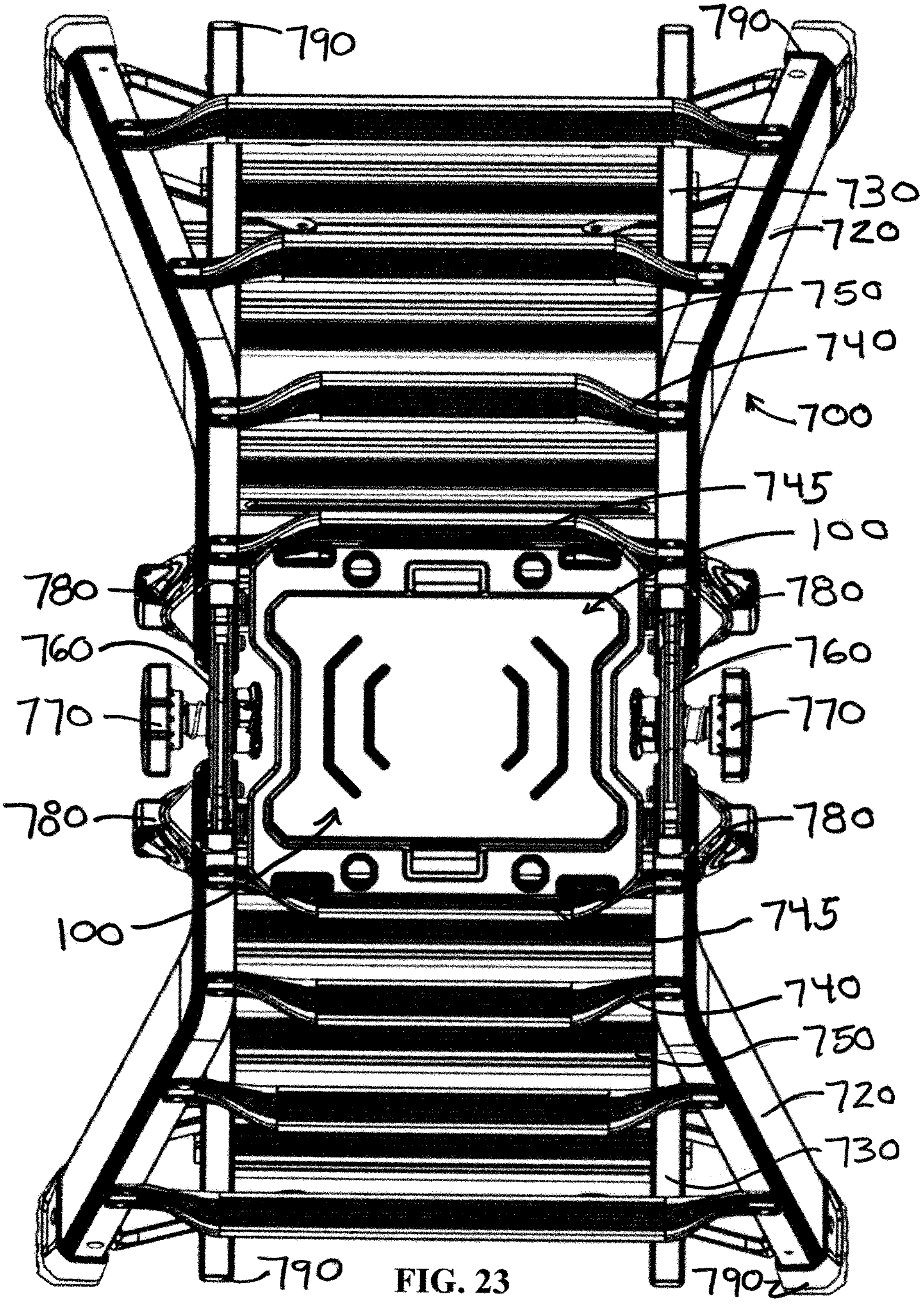
FIG. 23 depicts a top plan view of the multi-position ladder of FIG. 18.
Figure 24:
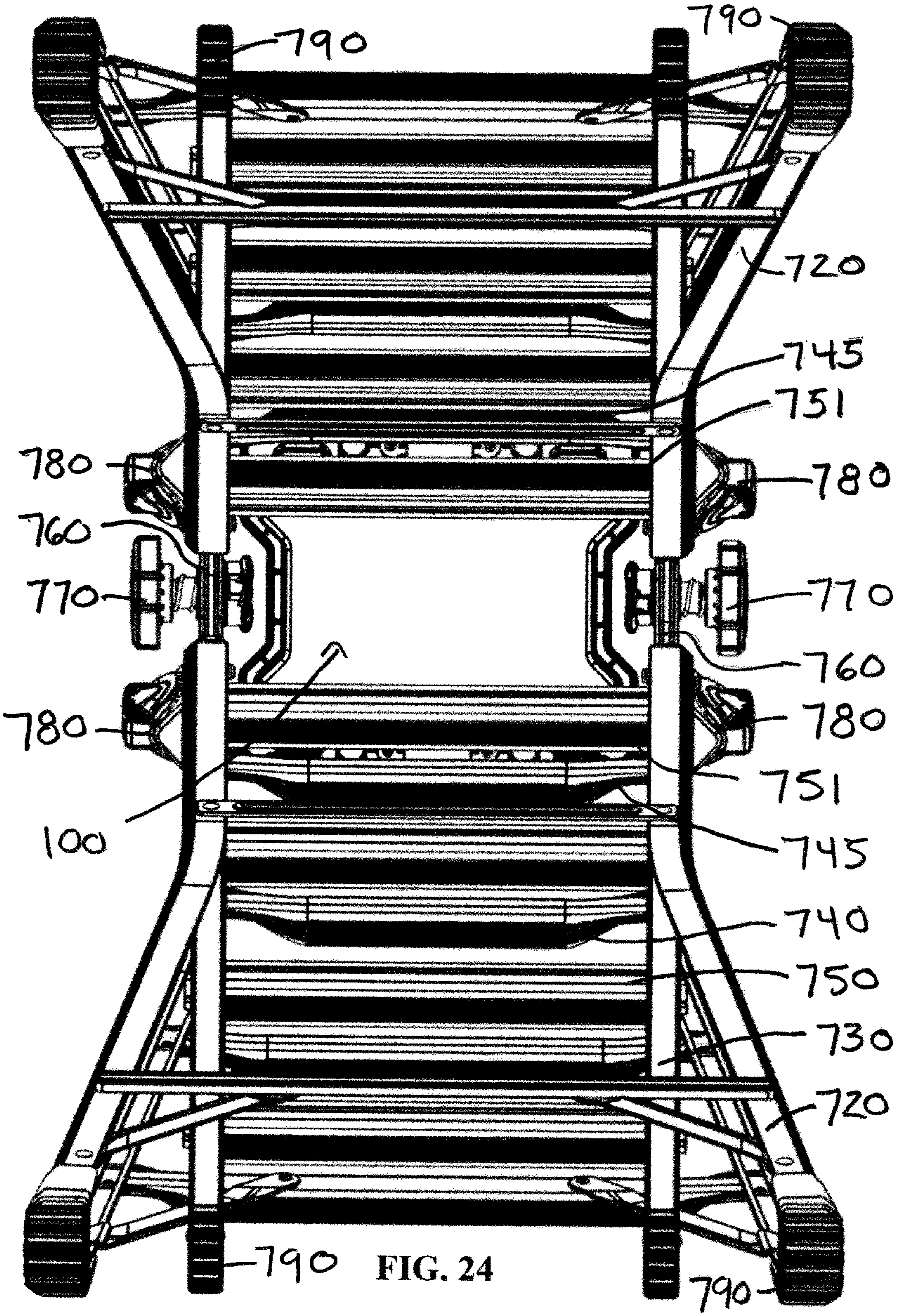
FIG. 24 depicts a bottom plan view of the multi-position ladder of FIG. 18.

As best seen in FIG. 17, the combined rail depth 705 of the multi-position ladder 700 in this orientation is larger than the bucket depth 190 and is positioned so that neither the bucket top surface 115 nor the bucket leg bottom surface 185 extends beyond the rails 720, 730 (see, FIG. 15). This not only prevents the bucket 100 from being inadvertently dislodged from the ladder 700 when stored, but also allows the outer rail rungs 740 to be used while the bucket 100 is in the stored position. Preferably, the bucket 100 is stored between the uppermost two or three inner rail rungs 750 to allow use of the ladder 700 with the inner rails 730 in longest extension.

Figure 25:
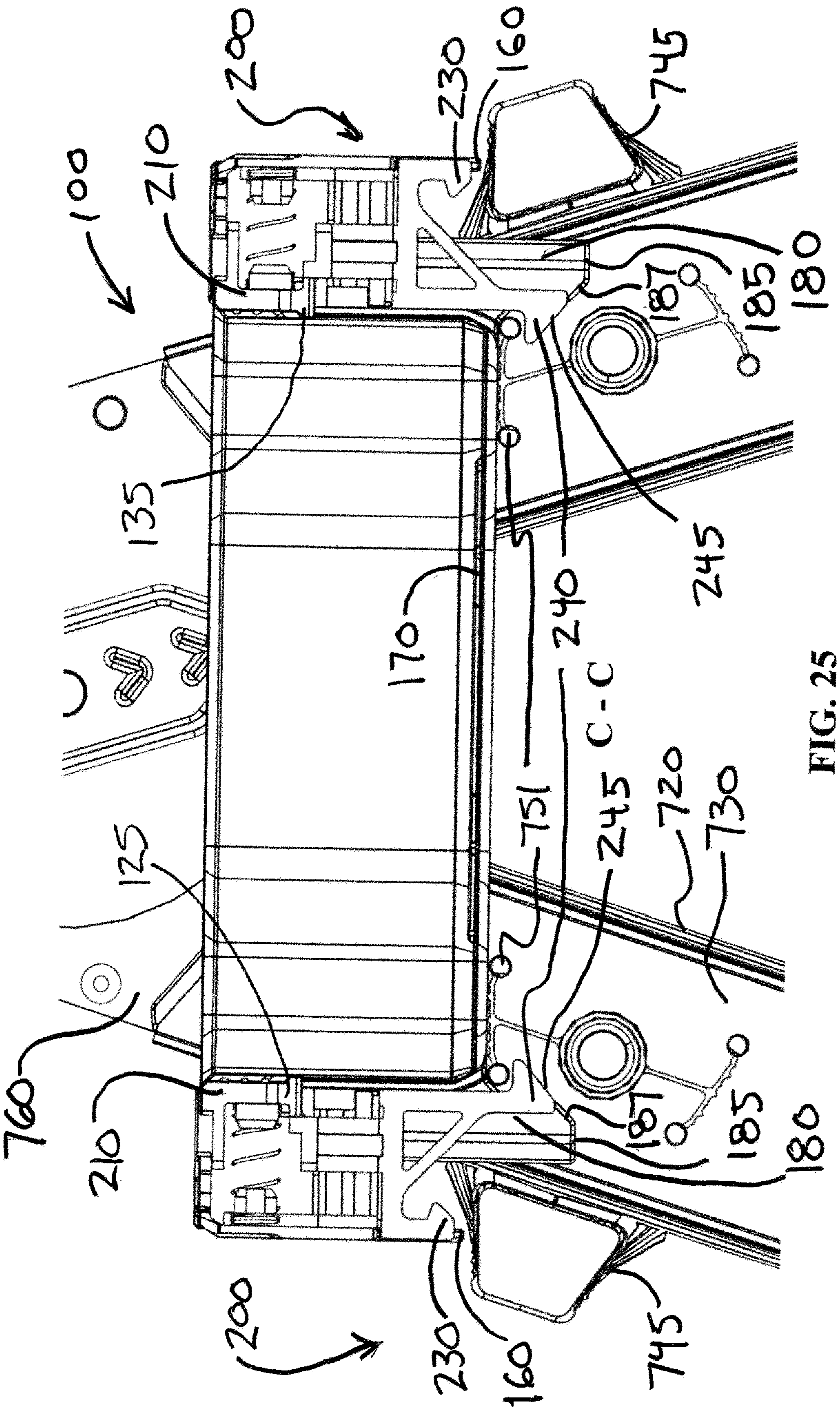
FIG. 25 depicts a cross-sectional view taken along the line C-C in FIG. 18.
Figure 26:
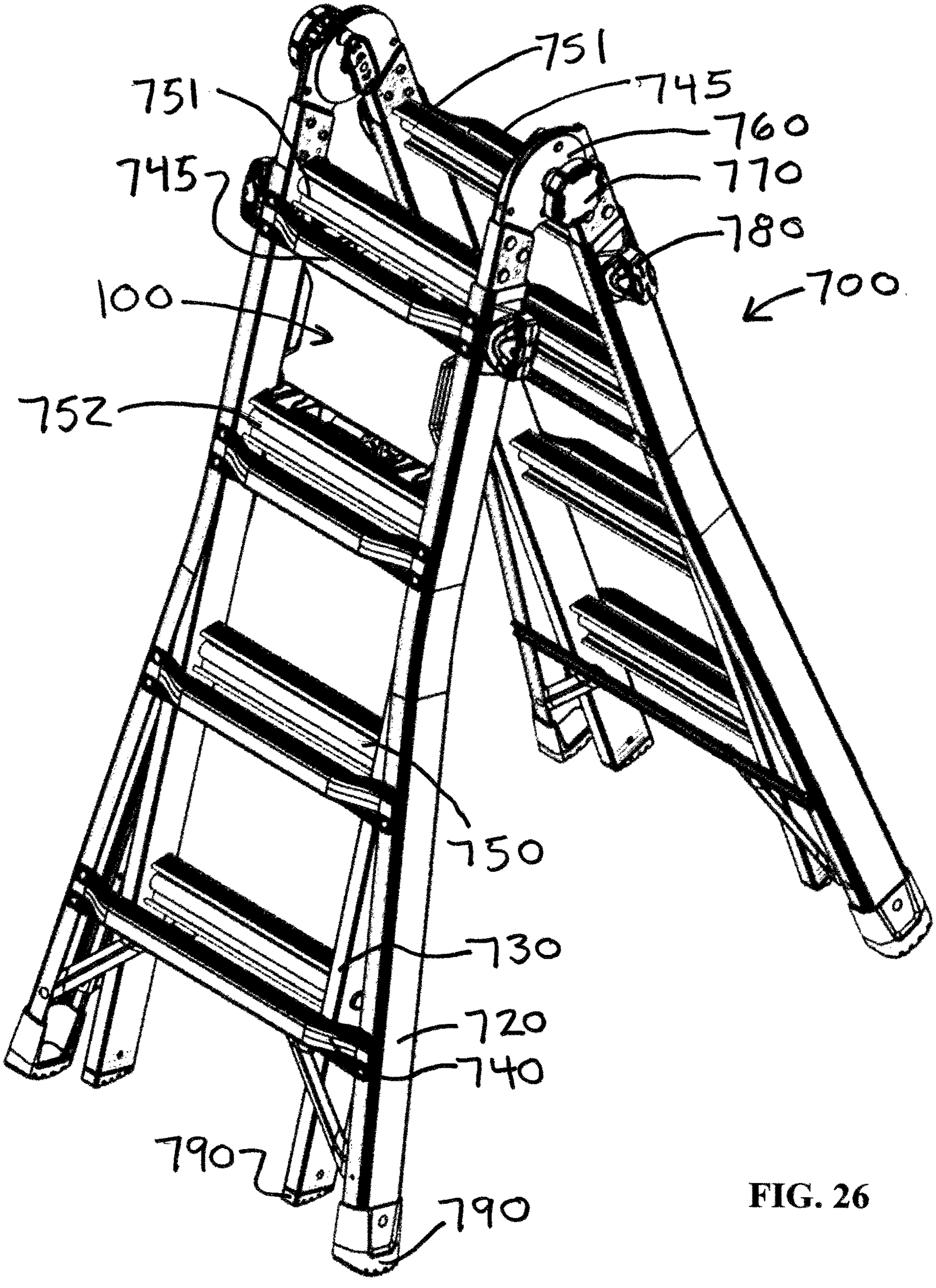
FIG. 26 depicts a perspective view of a multi-position ladder including in an open/in-use orientation with an embodiment of the multi-position ladder bucket of FIG. 1 in the stored position.
Figure 27:
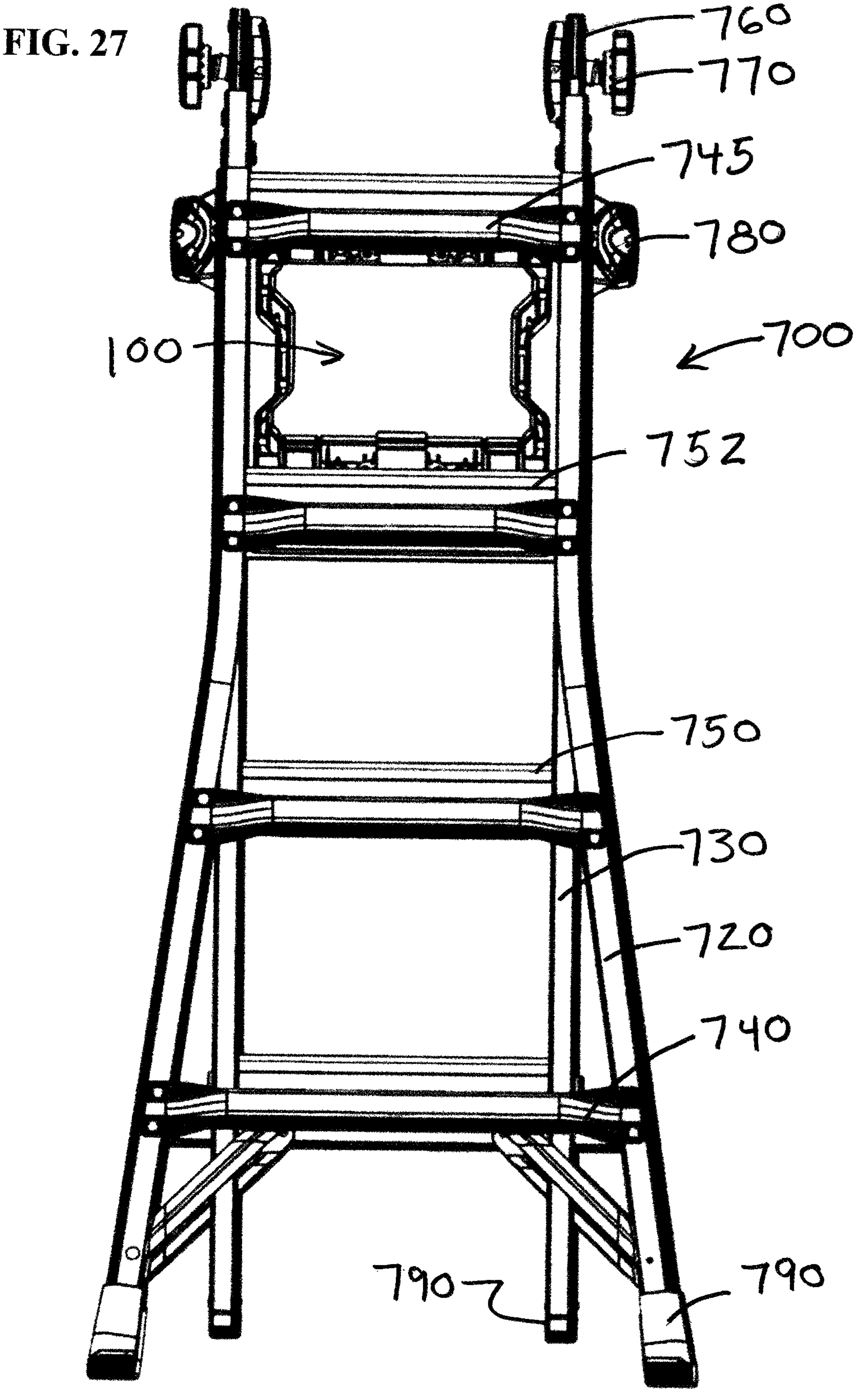
FIG. 27 depicts a front elevation view of the multi-position ladder of FIG. 26.
Figure 28:
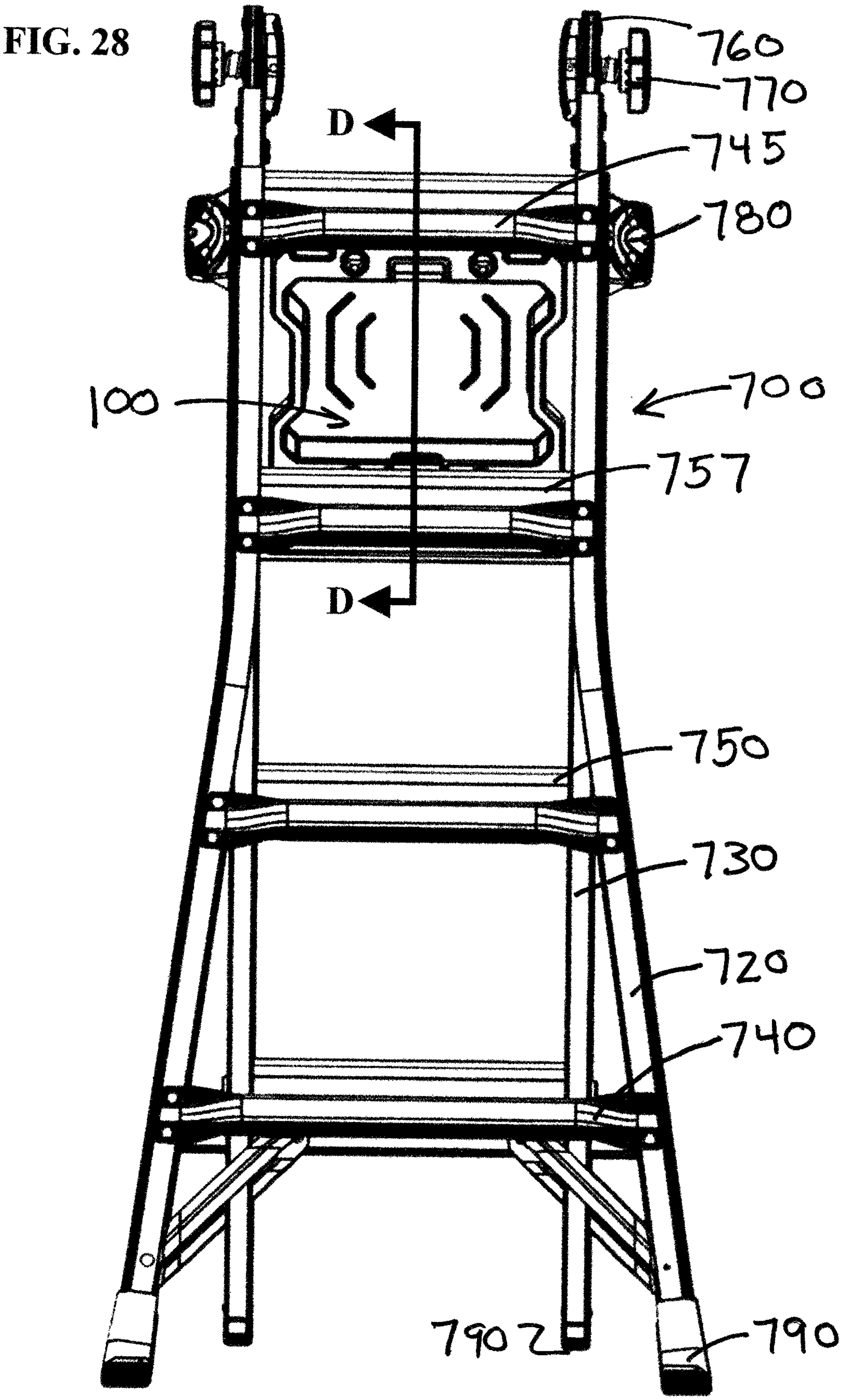
FIG. 28 depicts a rear elevation view of the multi-position ladder of FIG. 26.
Figure 29:
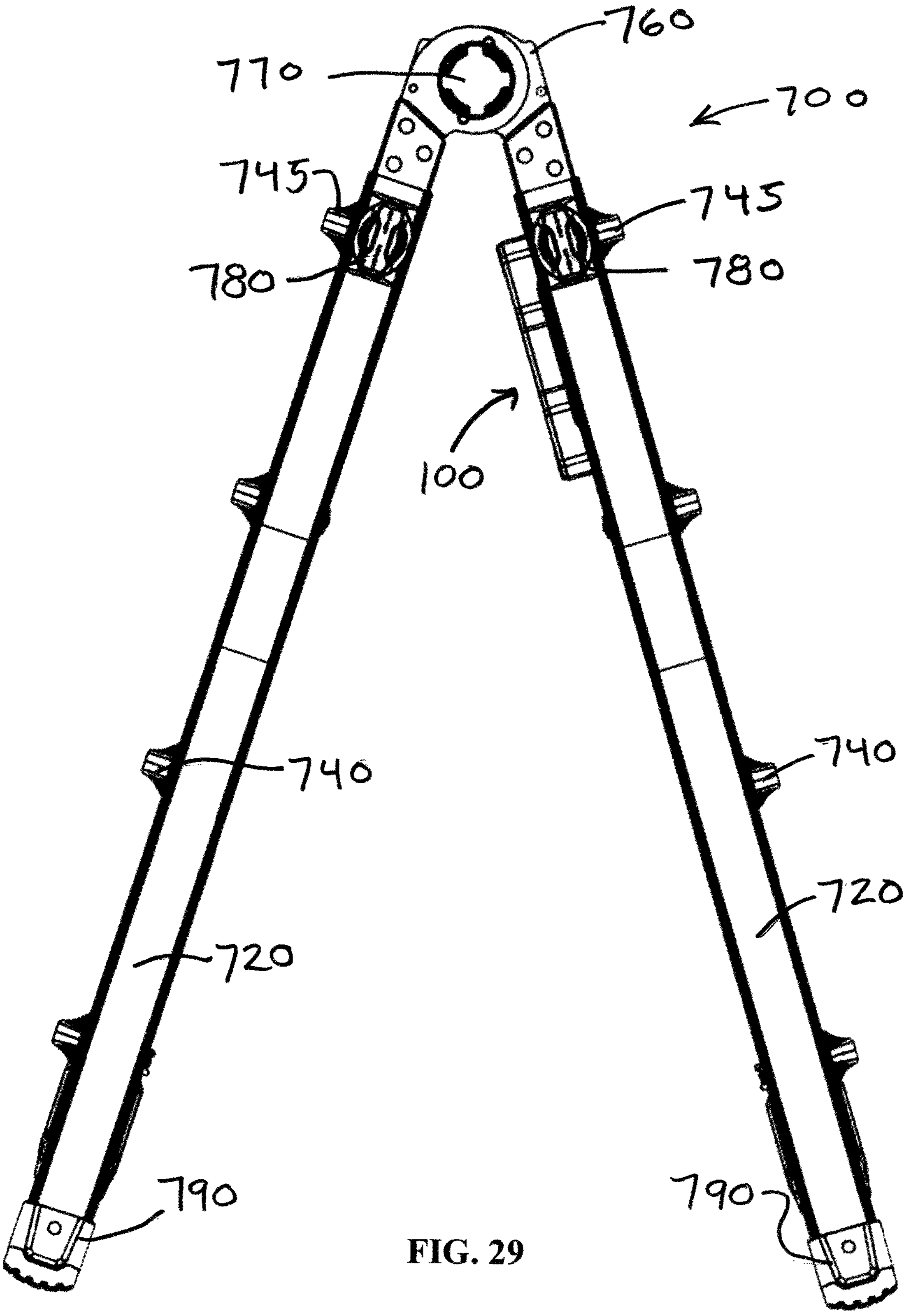
FIG. 29 depicts a left-side view of the multi-position ladder of FIG. 26.
Figure 30:
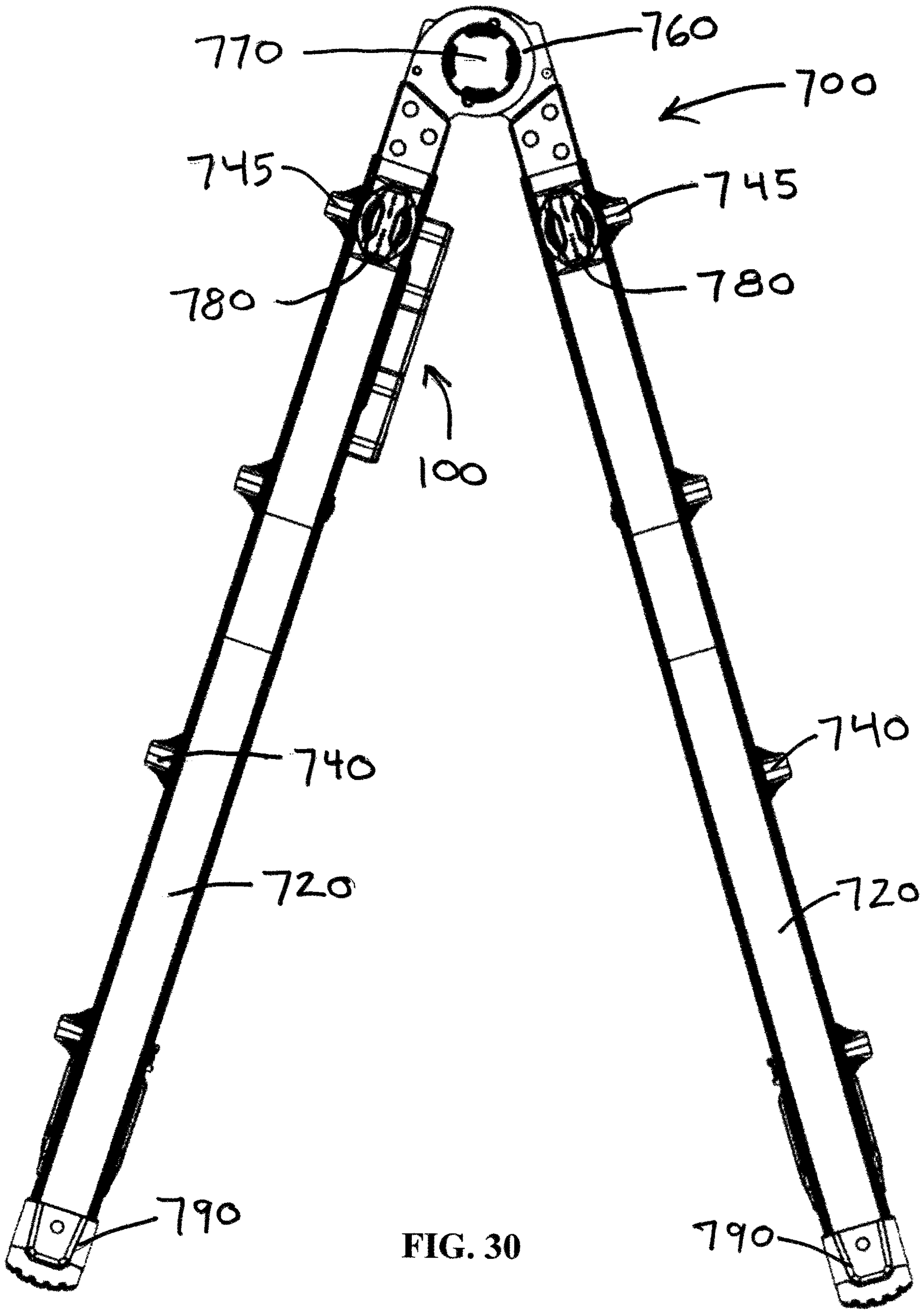
FIG. 30 depicts a right-side view of the multi-position ladder of FIG. 26.
Figure 31:
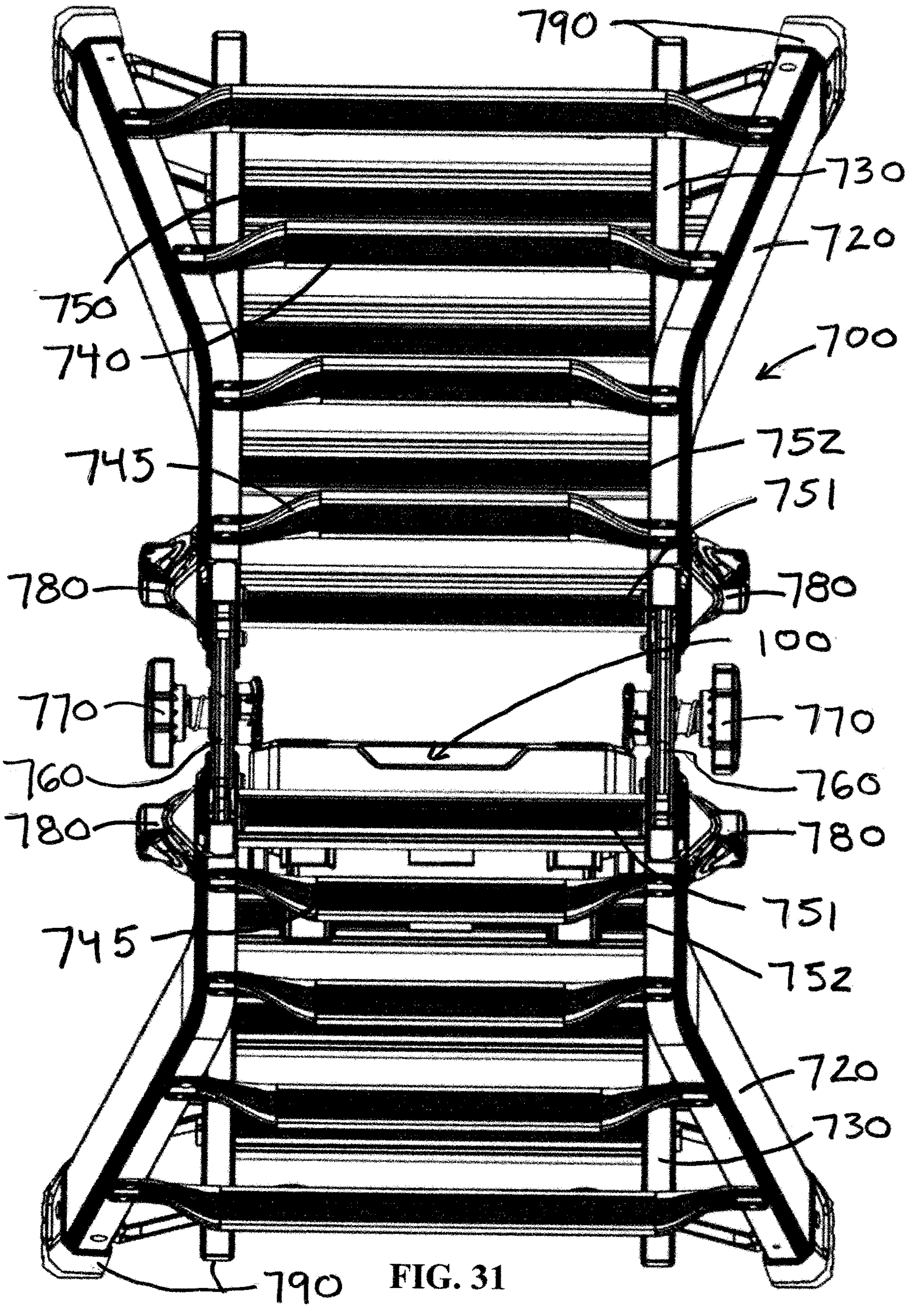
FIG. 31 depicts a top plan view of the multi-position ladder of FIG. 26.
Figure 32:
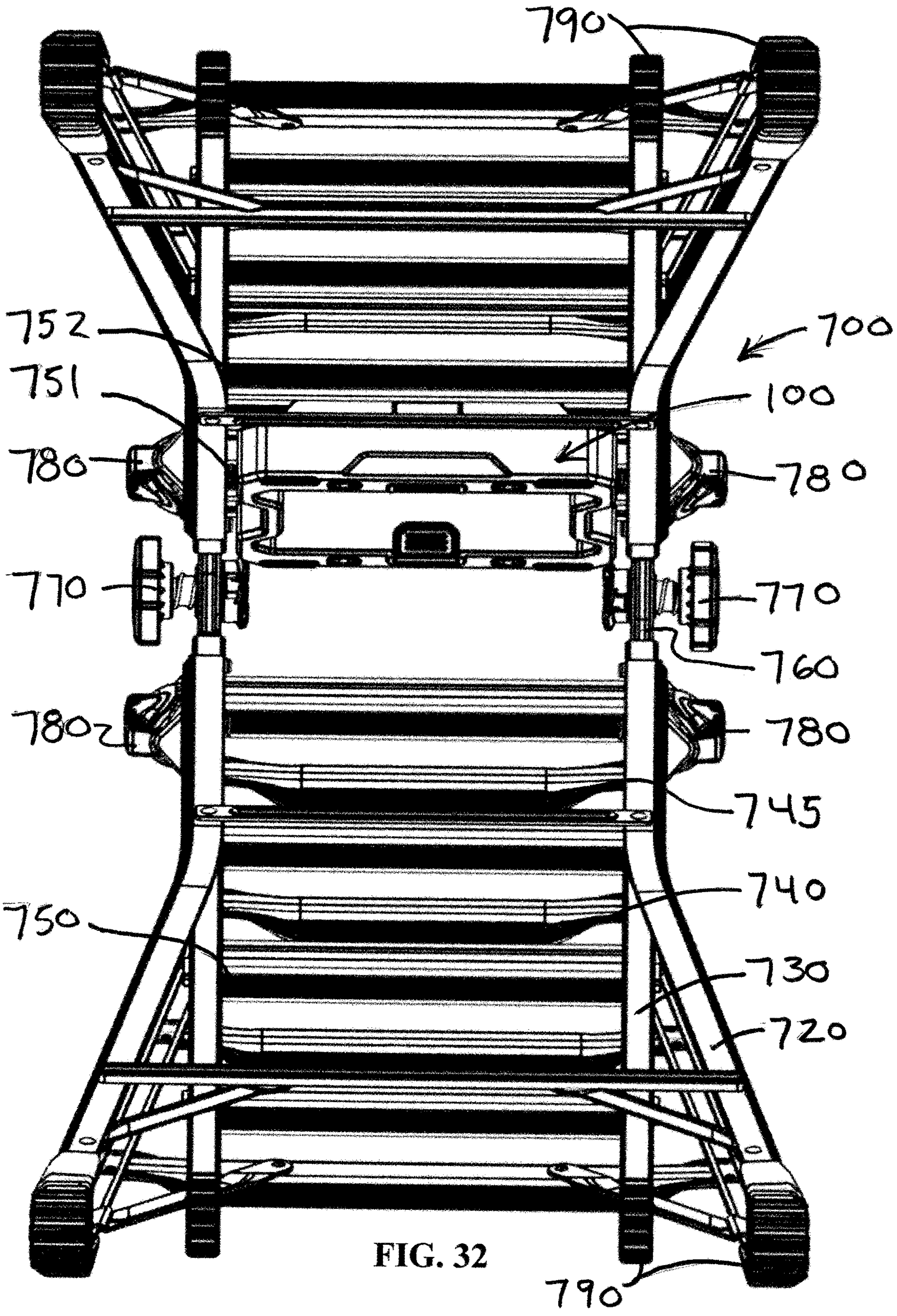
FIG. 32 depicts a bottom plan view of the multi-position ladder of FIG. 26.

FIGS. 18-25 illustrate ladder bucket 100 of the present invention in the use orientation on a multi-position ladder 700 in its A-frame orientation. In the use orientation, the bucket 100 is locked via the bucket latch use clamps 240 to the two uppermost ladder inner rail rungs 751 (top inner rung on each pair of inner rails 730 on each side of hinges 760). As best seen in FIG. 25, bucket latch clamps 240 hook the outer portion of their respective uppermost inner rail rungs 751 to secure the bucket 100 in place. Preferably the top of each uppermost inner rail rungs 751 when the ladder 700 is in the A-frame orientation is parallel to the bucket bottom outer surface 170 to provide optimum support for the bucket 100.

A preferred embodiment also includes the bucket latch use clamp outer face 245 having the same angle and being coplanar with the bucket leg inside lower chamfer 187. This arrangement will allow the bucket 100 to be pressed down onto the two uppermost inner rail rungs 751 without having to press the bucket latch button 210 to cause the bucket latches 220 to slide out horizontally and allow the bucket 100 to drop into place with the bucket bottom outer surface 170 abutting the top of each rail rung 751. Once the bucket is 100 in its proper use orientation, the latch springs 250 will bias the bucket latches 220 back to its locked position. Note that releasing the bucket 100 cannot be done in the same way and requires pressing of the bucket latch buttons 210.

Another preferred embodiment includes sizing the lips 160 of the front wall 120 and rear wall 130 such that they extend to either abutting or nearly abutting the top of their respective uppermost ladder outer rail rungs 745 to provide additional support against movement. Likewise, it is preferable that the bucket leg inside upper chamfers 188 (see, FIG. 5) are sized and configured to abut the innermost part of the top of their respective uppermost ladder inner rail rungs 751 to hold the bucket 100 in place in conjunction with the bucket latch use clamps 240.

Figure 33:
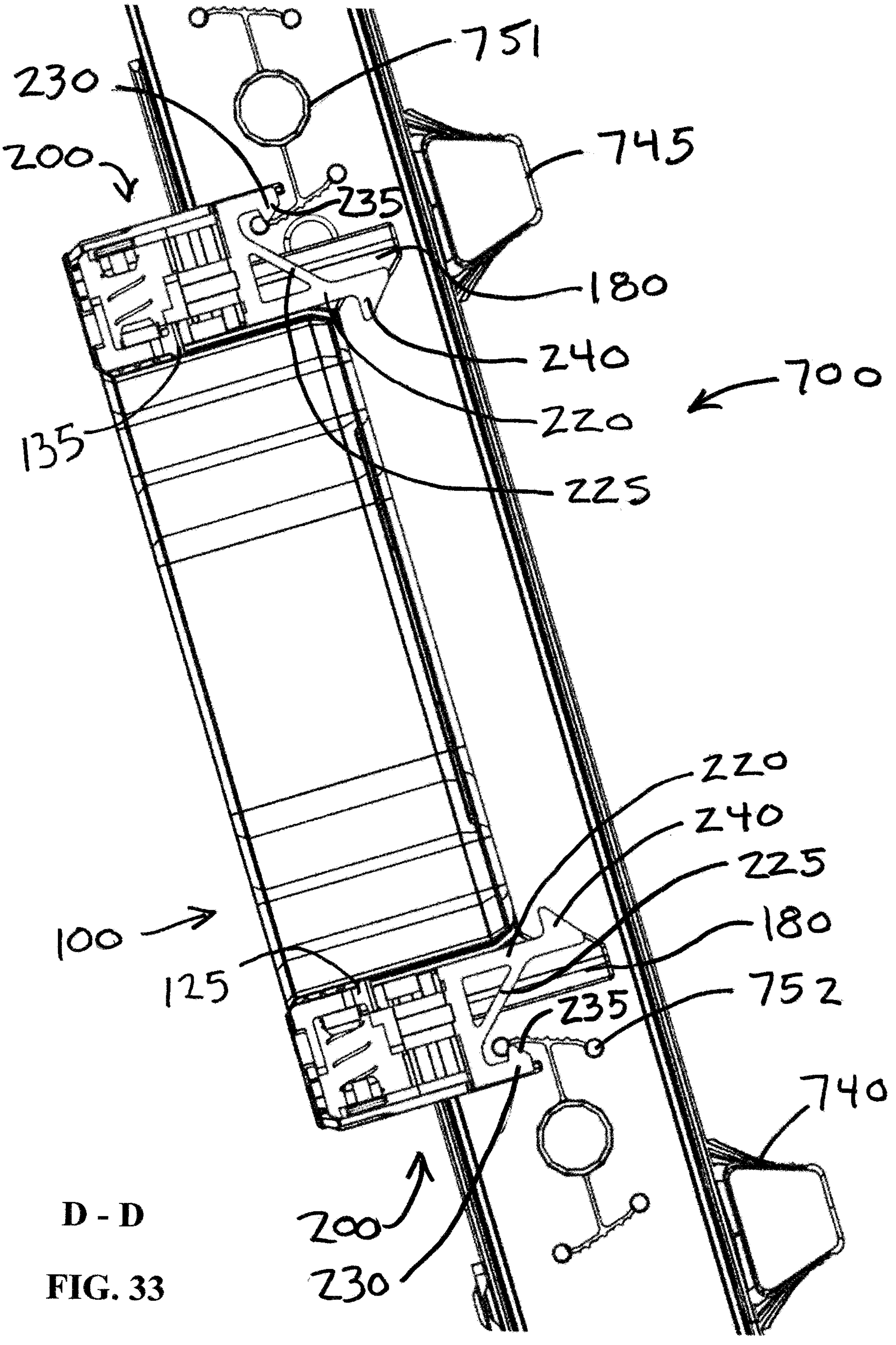
FIG. 33 depicts a cross-sectional view taken along the line D-D in FIG. 28.

FIGS. 19-33 illustrate ladder bucket 100 of the present invention in its stored orientation on a multi-position ladder 700 in its A-frame orientation. As best seen in FIG. 33, the furthest extending portion toward the outside of the ladder 700 is the bucket leg bottom surface 185. The disclosed arrangement keeps the bucket 100 stored within the outside profile of the outer rail 720, allowing full access to all ladder outer rail rungs 740, 745. This configuration also allows the multi-position ladder 700 to be used in its extension orientation (not illustrated) with the ladder bucket 100 in its stored orientation.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations, and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. A multi-position ladder bucket, comprising:
- a bucket interior volume defined by a front wall, a rear wall, a right side wall, a left side wall, and a bottom;
- a bucket latch mechanism associated with the front wall and a bucket latch mechanism associated with the rear wall, each latch mechanism comprising:
  - a latch button;
  - a latch spring; and
  - a bucket latch comprising:
    - a bucket latch storage clamp; and
    - a bucket latch use clamp.

2. The multi-position ladder bucket of claim 1, further comprising:
- a bucket lip;
- a bucket top surface;
- a front wall button orifice; and
- a rear wall button orifice;
- wherein each bucket latch mechanism is partially enclosed in the bucket lip and the front wall latch button protrudes through the front wall button orifice and the rear wall latch button protrudes through the rear wall button orifice.

3. The multi-position ladder bucket of claim 2 wherein the bucket top surface comprises:
- a front wall top surface button orifice; and
- a rear wall top surface button orifice;
- wherein the front wall latch mechanism protrudes through the front wall top surface button orifice and the rear wall latch mechanism protrudes through the rear wall top surface button orifice.

4. The multi-position ladder bucket of claim 3 wherein each latch mechanism slides linearly.

5. The multi-position ladder bucket of claim 4 wherein the spring of each latch mechanism biases the bucket latch toward the bucket interior volume.

6. The multi-position ladder bucket of claim 5 further comprising:
- a left side wall inset; and
- a right side wall inset.

7. The multi-position ladder bucket of claim 6 further comprising four bucket legs extending beneath the bucket latch mechanisms.

8. The multi-position ladder bucket of claim 7 wherein each bucket leg comprises:
- a leg bottom surface;
- a bucket leg inside lower chamfer; and
- a bucket leg inside upper chamfer.

9. The multi-position ladder bucket of claim 8 further comprising:
- a bucket latch storage clamp outer face;
- a bucket latch use clamp outer face; and
- a bucket latch inner face;
- wherein the bucket latch use clamp out face and the bucket leg inside lower chamfer are parallel.

10. The multi-position ladder bucket of claim 9 wherein the front wall, rear wall, right side wall, left side wall, bottom, lip, and legs are comprised of injection molded polypropylene.

11. The multi-position ladder bucket of claim 5 wherein the bucket latch storage clamp is configured to lock against a multi-position ladder inner rail rung.

12. The multi-position ladder bucket of claim 11 wherein the bucket latch use clamp is configured to lock against a multi-position ladder inner rail rung.

13. A multi-position ladder, comprising:
- two pairs of inner rails, each pair of inner rails connected by a plurality of inner rail rungs and the two pairs of inner rails connected by a pair of hinges;
- two pair of outer rails, each pair of outer rails connected by a plurality of outer rail rungs and each pair of outer rails slidable with a respective pair of inner rails and defining a combined rail depth;
- a multi-position ladder bucket, comprising:
  - a bucket interior volume defined by a front wall, a rear wall, a right side wall, a left side wall, and a bottom;
  - a bucket latch mechanism associated with the front wall and a bucket latch mechanism associated with the rear wall, each latch mechanism comprising:
    - a latch button;
      - a latch spring; and
      - a bucket latch comprising:
      - a bucket latch storage clamp; and
      - a bucket latch use clamp; and
- wherein the bucket latch storage clamp is configured to lock to a multi-position ladder inner rail rung and the bucket latch use clamp is configured to lock to a multi-position ladder inner rail rung.

14. The multi-position ladder of claim 13 wherein each pair of inner rails comprises:

an uppermost ladder inner rail rung; and a ladder inner rail adjacent rung;

wherein the ladder has a stored orientation and an A-frame orientation;

wherein the multi-position ladder bucket has a stored orientation and a use orientation; and wherein when the multi-position ladder bucket is in the stored orientation, one bucket latch storage clamp is locked to the uppermost ladder inner rail rung and the other bucket latch storage clamp is locked to the inner rail adjacent rung.

15. The multi-position ladder of claim 14 wherein when the ladder is in the A-frame orientation, one bucket latch use clamp is locked to one uppermost ladder inner rail rung and the other bucket latch use clamp is locked to the other uppermost ladder inner rail rung.

16. The multi-position ladder of claim 15 wherein each latch mechanism slides linearly.

17. The multi-position ladder of claim 16 wherein the spring of each latch mechanism biases the bucket latch toward the bucket interior volume.

18. The multi-position ladder of claim 17 further comprising:

four bucket legs extending beneath the bucket latch mechanism, each bucket leg comprising a bucket leg bottom surface; and a bucket top surface;

wherein the bucket leg bottom surface and bucket surface define a bucket depth; and the bucket depth does not exceed the combined rail depth.

19. The multi-position ladder of claim 18 wherein each bucket leg further comprises:

a bucket leg inside lower chamfer; and a bucket leg inside upper chamfer.

20. The multi-position ladder of claim 19 further comprising:

a bucket latch storage clamp outer face;

a bucket latch use clamp outer face; and a bucket latch inner face;

wherein the bucket latch use clamp out face and the bucket leg inside lower chamfer are parallel.

* * * * *